(12) United States Patent
Rutherford

(10) Patent No.: US 7,284,419 B2
(45) Date of Patent: Oct. 23, 2007

(54) TEMPORARY ATTACHMENT TIRE PRESSURE GAUGE

(76) Inventor: Robert B. Rutherford, 5 Shady Oaks Dr., Folsom, CA (US) 95630

( * ) Notice: Subject to any disclaimer, the term of this patent is extended or adjusted under 35 U.S.C. 154(b) by 0 days.

(21) Appl. No.: 11/442,622

(22) Filed: May 25, 2006

(65) Prior Publication Data

US 2007/0209432 A1   Sep. 13, 2007

Related U.S. Application Data

(60) Provisional application No. 60/684,663, filed on May 25, 2005.

(51) Int. Cl.
*B60C 23/02* (2006.01)
(52) U.S. Cl. .................................................. 73/146.8
(58) Field of Classification Search .................. 73/146, 73/146.2, 146.3, 146.4, 146.5, 146.8
See application file for complete search history.

(56) References Cited

U.S. PATENT DOCUMENTS

| | | | |
|---|---|---|---|
| 3,789,867 A | 2/1974 | Yabor | |
| 3,873,965 A | 3/1975 | Garcia | |
| 3,969,936 A | 7/1976 | Lindsay | |
| 3,990,309 A | 11/1976 | Beckwith | |
| 4,051,803 A | 10/1977 | Arnone | |
| 4,248,080 A | 2/1981 | Chuck | |
| 4,270,568 A | 6/1981 | Gray | |
| 4,279,161 A | 7/1981 | Huston | |
| 4,606,391 A | 8/1986 | Achterholt | |
| 4,619,137 A * | 10/1986 | Bott | 73/146.5 |
| 4,723,445 A | 2/1988 | Ripley | |
| 4,763,516 A * | 8/1988 | Greenspan | 73/146.8 |
| 4,773,270 A * | 9/1988 | Ogasawara et al. | 73/732 |
| 4,924,697 A * | 5/1990 | Hunt et al. | 73/146.8 |
| 4,953,395 A * | 9/1990 | Jard | 73/146.8 |
| 4,970,491 A * | 11/1990 | Saint et al. | 340/447 |
| 5,040,562 A | 8/1991 | Achterholt | |
| 5,357,242 A * | 10/1994 | Morgano et al. | 340/626 |
| 5,365,967 A * | 11/1994 | Moore | 137/226 |
| 5,377,539 A | 1/1995 | LaSalle | |
| 5,503,012 A | 4/1996 | Rabizadeh | |
| 5,694,111 A | 12/1997 | Huang | |
| 5,965,822 A | 10/1999 | Wu | |

(Continued)

OTHER PUBLICATIONS

Spiragage Plus product description.

*Primary Examiner*—Andre J Allenn
(74) *Attorney, Agent, or Firm*—Heisler & Associates

(57) ABSTRACT

A gauge is provided for monitoring pressure of air within a tire or other gas containing chamber. A gauge includes a receiver attachable to a valve stem of the tire. A valve core is also provided on the gauge through which fill air can be directed. In this way, the gauge does not need to be removed during filling of the tire with air. A pathway extends from the valve core to the receiver within the gauge. A pressure sensor, such as a Bourdon tube, is coupled to this pathway and monitors pressure within the tire. A lower body of the gauge includes a latching element which can be manually actuated to temporarily mount the gauge to the valve stem. The latching element can be in the form of levers which rotate and act as a toggle to engage the valve stem and secure the gauge to the valve stem.

27 Claims, 13 Drawing Sheets

U.S. PATENT DOCUMENTS

| | | | |
|---|---|---|---|
| 6,085,595 A * | 7/2000 | Ferguson | 73/730 |
| 6,119,525 A | 9/2000 | Hamma | |
| 6,843,115 B2 | 1/2005 | Rutherford | |
| 7,040,152 B2 | 5/2006 | Rutherford | |

* cited by examiner

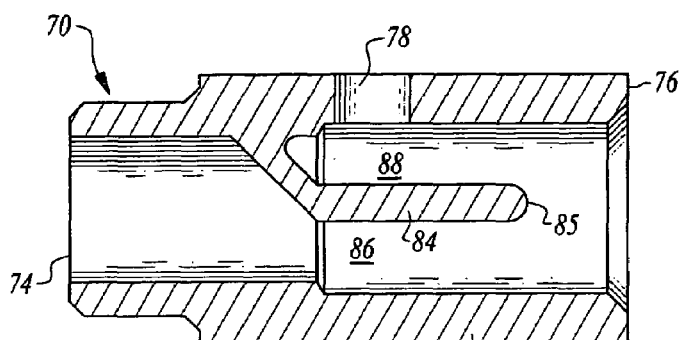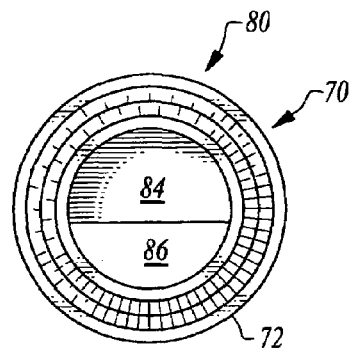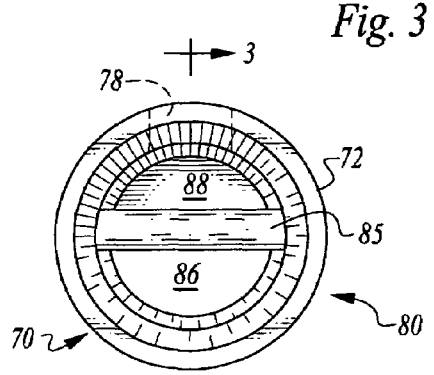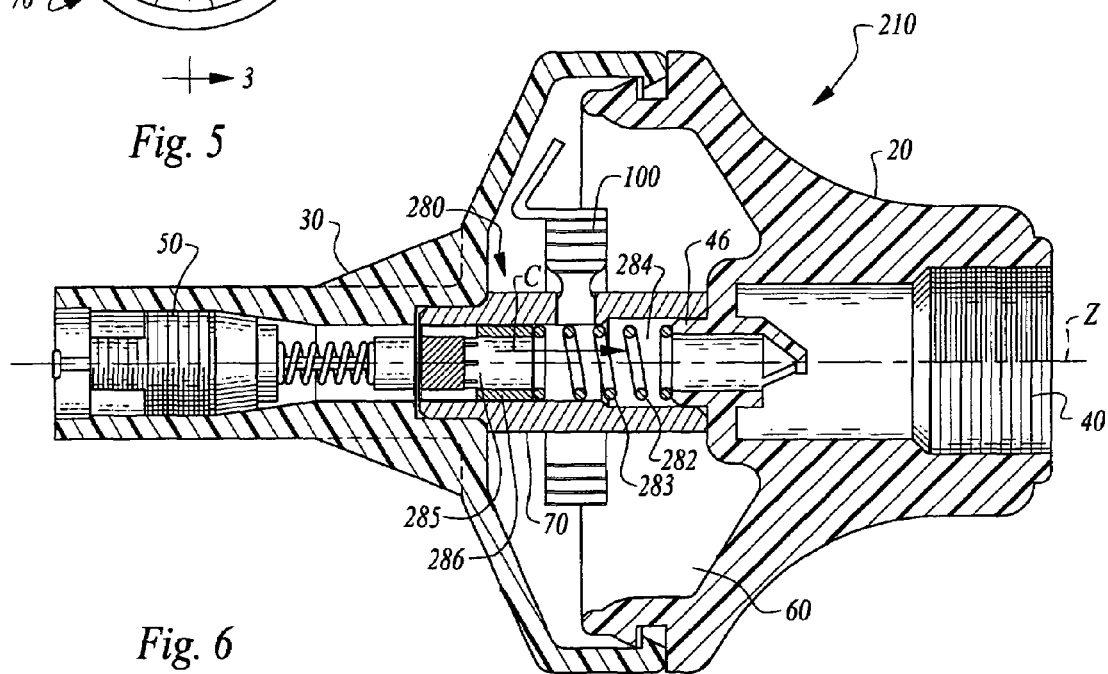

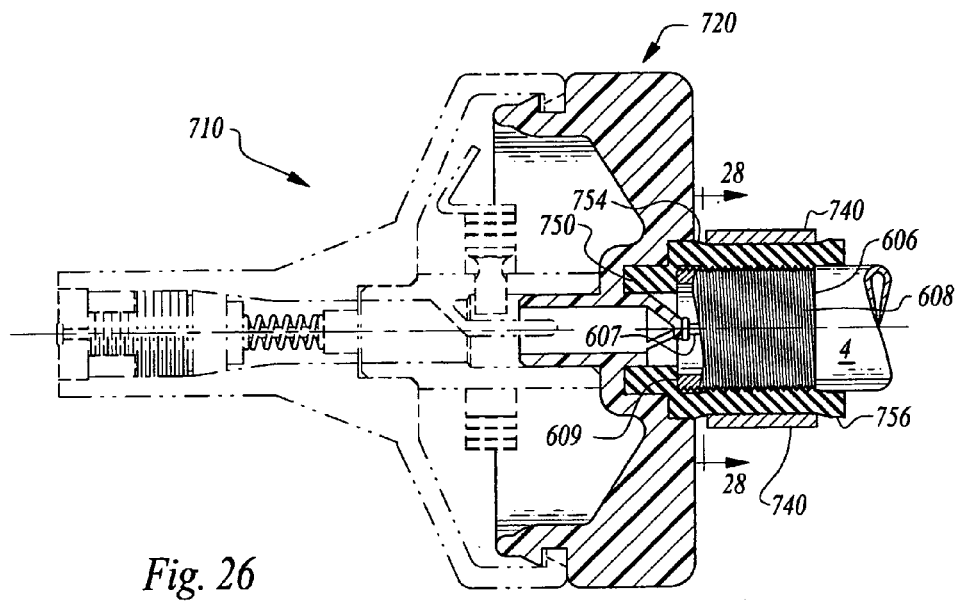
Fig. 26
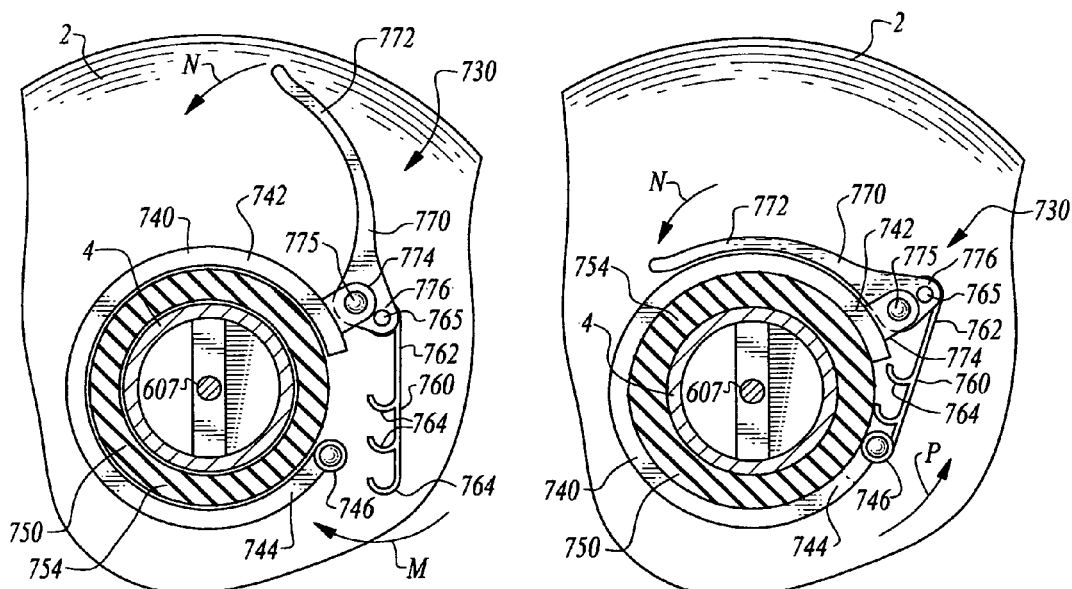
Fig. 27
Fig. 28

TEMPORARY ATTACHMENT TIRE PRESSURE GAUGE

CROSS-REFERENCE TO RELATED APPLICATIONS

This application claims benefit under Title 35, United States Code § 119(e) of U.S. Provisional Application No. 60/684,663 filed on May 25, 2005.

FIELD OF THE INVENTION

The following invention relates to pressure gauges and particularly pressure gauges adapted to be attached to tires and other similar gas filled chambers. More particularly, this invention relates to pressure gauges which include a valve core which allows fill air to be routed through the gauge and into the chamber to which the gauge is attached, and which additionally feature latching elements for quickly, securely but temporarily mounting the gauge to the valve stem; so that the gauge can be held thereon without requiring the gauge to be separately held by a user during introduction of fill air through the gauge and into the valve stem.

BACKGROUND OF THE INVENTION

One important criteria for safely operating a motor vehicle is the maintenance of proper pressure within tires of the vehicle. If tire pressure is not maintained, fuel economy is adversely affected and rates of tire wear increase. Additionally, handling of the vehicle can be adversely affected and the potential for abrupt failure of the tire is increased. Hence, it is advisable to monitor the pressure within vehicle tires on a regular basis.

One of the difficulties encountered in such regular tire pressure monitoring is that a significant amount of time is associated with monitoring tire pressure. In particular, a safety cap must be removed from the valve stem (and not misplaced). The gauge must be placed upon the valve stem of the tire. Care must be taken to make sure that a significant amount of air is not lost from the tire during this gauge installation process. The pressure can then be read from the gauge. If the tire pressure is adequate, the procedure is completed for that tire and the next tire can be checked. On a vehicle with multiple tires, this basic routine can be significantly time consuming, decreasing the likelihood that tire pressure monitoring will occur on a sufficiently frequent basis.

Compounding this difficulty is the inconvenience encountered when tire pressure is low and air needs to be added to the tire. First the gauge is removed. Then the vehicle is brought into proximity with a source of compressed air. Then compressed air is added to the tire. Unless an accurate gauge is associated with the source of compressed air, the source of compressed air must be removed after a relatively short period of time and the pressure gauge reinserted on the valve stem to take another reading. Typically, a half a dozen or so filling steps and measuring steps are involved before the tire pressure has been brought to the proper level.

It is known in the prior art to provide tire pressure gauges which are mountable upon a valve stem and which are sufficiently small and lightweight that they can remain mounted to the tire during operation of the tire. While this solves a portion of the problem, the difficulty associated with adding air to the tire is not alleviated. In at least two prior art patents, tire pressure gauges are taught which further allow for a source of compressed air to pass into the valve stem of the tire while the gauge remains upon the valve stem. In particular, U.S. Pat. No. 5,377,539 to LaSalle and U.S. Pat. No. 4,924,697 to Hunt (each incorporated herein by reference in their entirety) disclose tire pressure gauges which can mount on a valve stem of a tire and which also include a port through which compressed air can be added without removing the tire pressure gauge. Bourdon tubes are susceptible to de-calibration or other damage if gas having a pressure greater than a maximum pressure for which the Bourdon tube is calibrated is encountered by the Bourdon tube or other pressure sensor. For instance, many Bourdon tubes are calibrated to accurately read pressures between 0 psi (pounds per square inch) and 60 psi. If air or other gases having a pressure greater than 60 psi pass into the Bourdon tube, the Bourdon tube becomes uncoiled beyond an elastic limit of the Bourdon tube so that the Bourdon tube becomes permanently deformed. The Bourdon tube then typically ceases to accurately read pressure through an indicator portion thereof. Other failure modes also exist including rupture of the Bourdon tube so that it does not provide any reading whatsoever thereafter. The problem of Bourdon tube damage and de-calibration is particularly pernicious in that in some over-pressure failure modes, the Bourdon tube may appear to be functioning properly, when in fact it has become de-calibrated.

Many sources of fill air or other fill gas are provided at very high pressures (as high as 250 psi or higher). With such high pressure fill air, tires or other chambers can be quickly filled. However, such high pressure fill air/gas sources provide a serious threat to the proper function of a Bourdon tube, or many other types of pressure sensors. The patents to LaSalle and Hunt fail to address this problem. Accordingly, a need exists for a gauge including an over-pressure protector to protect the pressure sensor from experiencing pressures greater than a maximum pressure for the sensing element.

Most prior art pressure gauges are adapted to be temporarily placed upon the valve stem to obtain a pressure reading, and then are removed from the valve stem for introduction of additional fill air. While some prior art gauges are designed to be somewhat permanently mounted to the valve stem, such as by threading onto the threads of the valve stem, such semi-permanent attachment disadvantageously involves a separate gauge for each of the wheels of a vehicle or complex attachment/detachment repetition. Accordingly, a need exists for a gauge which can have fill air introduced through the gauge, but which gauge is securely but only temporarily mounted to the valve stem, so that the gauge can be used on a temporary basis with each tire being checked and/or filled with air.

SUMMARY OF THE INVENTION

With this invention a gauge is provided which can both sense pressure within a tire or other air filled chamber and allow air (or other gas) to be filled into the tire with the gauge remaining in place upon a valve stem of the tire. The gauge includes a pressure sensor, such as a Bourdon tube, which is shielded by a sensor protector so that over-pressure fill air does not damage the sensor element while the fill air is passing through the gauge and into the tire.

The gauge generally includes a receiver adapted to be mounted to a valve stem of a tire or other chamber to be filled with air. This receiver is preferably configured so that it can be mounted to the valve stem and remain upon the valve stem both during a filling procedure and preferably also after the filling procedure and during operation of the tire. A valve core is also provided on the gauge with a fluid path extending between the valve core and the receiver so that air or other gas from a source of fill air/gas coupled to the valve core can pass from the valve core, along the path, through the receiver and into the tire without requiring removal of the gauge.

A pressure sensor, such as a Bourdon tube, has an open inner end thereof coupled to a port adjacent the path between the valve core and the receiver. The sensor protector is adjacent this port so that over-pressure air is prevented from passing into the Bourdon tube or other pressure sensor.

The sensor protector according to a first embodiment includes a divider wall spacing the inner end of the Bourdon tube from a bypass path for air/gas passing from the valve core to the receiver. The bypass path is only in communication with the inner end of the Bourdon tube at a location downstream of the divider wall, such that a Venturi effect is created, causing a reduced pressure zone to be located adjacent the inner end of the Bourdon tube while the high pressure air is flowing through the bypass path and adjacent the divider wall.

In a second embodiment, the sensor protector is in the form of a slide/spring assembly which blocks the port leading to the inner end of the Bourdon tube when a dangerously high pressure exists within the path, and allows access between the path and the port leading to the inner end of the Bourdon tube or other pressure sensor when pressure within the path is below a maximum pressure for the pressure sensor.

In a third embodiment, the sensor protector is in the form of a filter flow protector which is in the form of a porous mass either within the path between the valve core and the receiver or within the port leading to the inner end of the Bourdon tube or other sensor element. This porous mass has sufficiently tortuous pathways extending therethrough that friction losses encountered by the flowing high pressure fill air/gas cause a sufficient pressure reduction to make the pressure actually experienced by the Bourdon tube or other pressure sensor reduced to a safe level. When flow has ceased, static pressure through the porous mass is constant on both sides of the porous mass such that accurate pressure readings are obtained.

In a fourth embodiment, a flexible plate is provided overlying an entrance into the port leading to the inner end of the Bourdon tube or other sensor element. This flexible plate can flex between an open position and a closed position sensitive to pressure within the path between the valve core and the receiver. When the pressure is above a threshold maximum pressure, the flex plate flexes to a closed position and blocks the entrance to the inner end of the Bourdon tube or other pressure sensor. When the pressure within the path is below this threshold pressure, the flex plate flexes to an open position allowing air to flow into the Bourdon tube or other pressure sensor.

While the gauge can be semi-permanently attached to the valve stem, such as by providing threads on a receiver of the gauge and rotating the gauge onto the valve stem, most preferably in the preferred embodiment of this invention the gauge is configured to only be temporarily attached to the valve stem of the tire. In particular, a latching element is provided which can be manually actuated between a locked position and a released position. The gauge is placed on the valve stem loosely, and then the latching element is actuated, causing the gauge to securely engage the valve stem. The gauge can then be utilized according to the disclosure of this invention.

The latching element is most preferably in the form of a pair of levers which are pivotably attached to the housing and act as a form of toggle mechanism. The levers preferably include teeth at inner ends thereof which engage threads of the valve stem. The levers have outer ends which can be manually engaged by fingers of a user. In this way, pulling on the levers, while typically simultaneously pushing on the housing of the gauge, will cause the gauge to be securely mounted upon the valve stem. When the levers are later pushed, the gauge is released from the valve stem and the gauge can be readily used at the next tire to be evaluated and/or filled, without requiring removal of the gauge in a repetitive fashion during the filling process.

Other latching elements for temporarily but securely attaching the gauge to the valve stem include clamp mechanisms with a band and clasp acting with a handle to compress a compression washer around the valve stem and secure the gauge to the valve stem on a temporary basis for filling of the particular tire involved. Still other mechanisms could be in the form of levers similar to those commonly used on bicycle tire pumps fitted with Schraeder valve couplings.

OBJECTS OF THE INVENTION

Accordingly, a primary object of the present invention is to provide a pressure gauge attachable to a tire and which allows fill air to pass through the gauge and into the tire without removal of the gauge and dangerously high pressure fill air prevented from causing damage to a pressure sensing element within the gauge.

Another object of the present invention is to provide a Bourdon tube with an over-pressure protector adjacent an inner end thereof which protects the Bourdon tube from experiencing damagingly high pressure.

Another object of the present invention is to provide a method for filling a tire without requiring removal or replacement of a gauge and without damaging a pressure sensor of the gauge even when fill air is provided at a pressure greater than a maximum safe pressure for the pressure sensor of the gauge.

Another object of the present invention is to provide a tire pressure gauge which can remain mounted upon a tire during operation of the tire and while filling the tire with a sensor element within the gauge protected against over-pressure during filling of the tire with fill air/gas at a higher pressure than a maximum pressure that the sensor element can safely encounter.

Another object of the present invention is to provide a tire pressure gauge or gauge for other air/gas filled chambers which can remain upon a valve stem of the tire/chamber during filling of the chamber.

Another object of the present invention is to provide a tire pressure gauge which can be temporarily but securely attached to a valve stem of a tire and provide a fill-through capability so that the gauge need not be removed during the filling procedure, but which can be readily removed and reused on a separate tire when a separate tire is to be evaluated and/or filled with air or other fluids.

Another object of the present invention is to provide a tire pressure gauge which allows fill air to pass through the gauge and into the tire without removal of the gauge, but which gauge can be easily and readily attached and detached to the valve stem.

Another object of the present invention is to provide a tire pressure gauge which allows fill air to pass through the gauge and into the tire without removal of the gauge and which has a modular configuration with various different interchangeable lower bodies which have various different means for temporarily or semi-permanently mounting the gauge onto a valve stem of a tire, and upper bodies including various different forms of sensing elements and/or sensing element over-pressure protection structures therein.

Other further objects of the present invention will become apparent from a careful reading of the included drawing figures, the claims and detailed description of the invention.

BRIEF DESCRIPTION OF THE DRAWINGS

FIG. 3 is a full sectional view of a central column of the embodiment of FIG. 2 featuring a venturi sensor protector interposed between a valve core and receiver of the gauge.

FIG. 4 is a left end view of that which is shown in FIG. 3.

FIG. 5 is a right end view of that which is shown in FIG. 3.

FIG. 6 is a full sectional view of a second embodiment of the gauge of this invention featuring a slide/spring type sensor protector for the pressure sensor of the gauge.

FIG. 26 is a full sectional view similar to that which is shown in FIG. 25 but after complete mounting of the gauge of this embodiment upon the valve stem.

FIG. 27 is a sectional view taken along line 27-27 of FIG. 25 and showing the clamp of this embodiment before engagement thereof.

FIG. 28 is a sectional view taken along line 28-28 of FIG. 26 after engagement of the clamp to secure the alternative temporary attachment gauge of this embodiment to the valve stem.

DESCRIPTION OF THE PREFERRED EMBODIMENT

Figure 1:
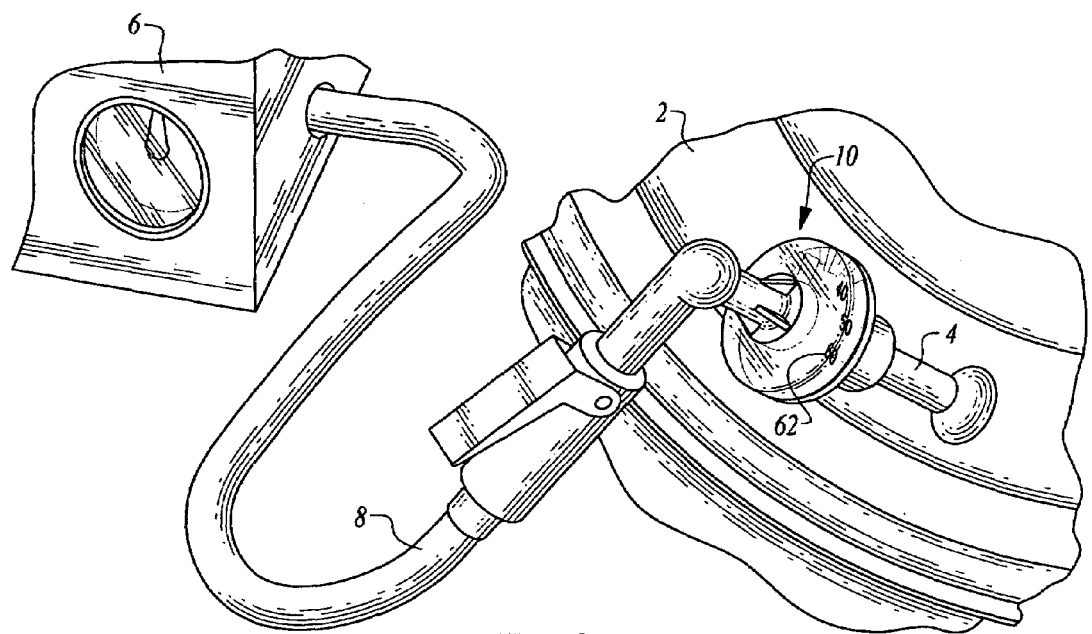
FIG. 1 is a perspective view of a wheel and tire combination with a gauge of this invention coupled thereto and with an air compressor and hose shown filling the tire through the gauge of this invention.

Referring to the drawings, wherein like reference numerals represent like parts throughout the various drawing figures, reference numeral 10 (FIGS. 1 and 2) is directed to a tire pressure gauge 10 according to a first embodiment of this invention. The gauge 10 is configured to be mountable to a chamber of compressed air or gas, such as a tire 2 through a valve stem 4 thereof. The gauge 10 is also configured to allow compressed air or other gas to be delivered into the tire 2 through the gauge 10. For instance, an air compressor 6 can supply compressed air through a hose 8 which is attachable to the gauge 10 for filling of the tire 2 through the gauge 10. In this way, the gauge 10 does not need to be removed during the tire 2 filling process. Rather, the gauge 10 can remain upon the tire 2 during the filling process, and preferably also during operation of the tire 2. The gauge 10 is additionally configured to protect a pressure sensor, such as a Bourdon tube 100, within the gauge 10 from over-pressure that may exist from air or other gas supplied by the compressor 6 or other source of compressed air/gas. Thus, the pressure sensor within the gauge 10 is protected from damage during the filling process.

Figure 2:
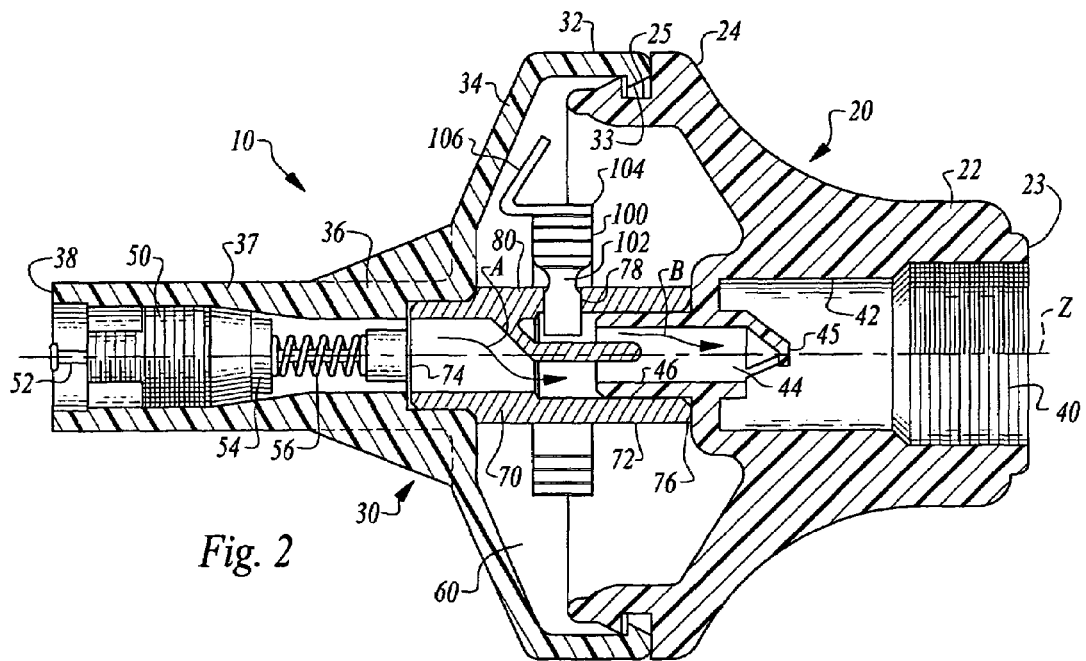
FIG. 2 is a full sectional view of the gauge of this invention according to a first embodiment.

In essence, and with particular reference to FIG. 2, basic details of the gauge 10 are described according to a first embodiment. The gauge 10 is preferably formed from a lower body 20 coupled to an upper body 30. A receiver 40 is located in the lower body 20 and is adapted to be attachable to the valve stem 4 of the tire 2 or other elevated pressure air/gas chamber. A valve core 50 is provided upon the upper body 30 with the valve core 50 adapted to be coupled to a source of compressed air such as an air compressor 6, through a hose 8 or other delivery structure.

A chamber 60 is provided between the lower body 20 and the upper body 30. This chamber provides a location for the pressure sensing element, such as a Bourdon tube 100. At least a portion of the upper body 30 is preferably transparent so that a position of the Bourdon tube 100 can be viewed for reading pressure indicated by the pressure sensor. A column 70 extends along a centerline of the gauge 10 and through the chamber 60. The column 70 defines a path for compressed air to flow between the valve core 50 and the receiver 40 through the gauge 10. In the first embodiment represented by the gauge 10, the sensor protector is in the form of a venturi protector 80 within the column 70. In other embodiments, this venturi protector 80 is replaced with other forms of sensor protectors according to other embodiments of this invention. The venturi protector 80 or other sensor protector is located adjacent the Bourdon tube 100 or other pressure sensor and ensures that dangerously high pressures for the Bourdon tube 100 do not pass from the path within the column 70 into the Bourdon tube 100 so that the Bourdon tube 100 is effectively protected.

More specifically, and with particular reference to FIGS. 2-5, particular details of the gauge 10 are described according to the first embodiment. While the gauge 10 is preferably formed from two separate bodies including the lower body 20 and the upper body 30, the particular configuration of these bodies 20, 30 or the number of subassemblies making up various parts of the gauge 10 could be altered consistent with the scope of this invention. Most preferably, the lower body 20 and upper body 30 are each formed of a plastic material or other lightweight easily formable material which is at least partially transparent for viewing of a pressure sensor element within the chamber 60 of the gauge 10.

Most preferably, the lower body 20 is substantially radially symmetrical about a central axis Z and includes a neck 22 at a base 23 defining a portion of the lower body 20 adapted to be placed adjacent the valve stem 4 of the tire 2. The lower body 20 extends away from the base 23 from the neck 22 to a shoulder 24 which defines a greatest diameter portion of the lower body 20. A groove 25 is preferably formed within the shoulder 24 which facilitates connection to the upper body 30.

The upper body 30 is in many ways similar in form to the lower body 20 except that it is reversed. In particular, the upper body 30 includes a rim 32 having a diameter similar to that of the shoulder 24 of the lower body 20. A tooth 33 extends inwardly from the rim 32 slightly and is sized to snap into the groove 25 and the shoulder 24. The rim 32 and tooth 33 can either be bonded to the groove 25 and shoulder 24 or be fitted with a sealing element and exhibit a friction fit or sufficiently tight fit so that an airtight seal is provided between the upper body 30 and the lower body 20. In this way, should the pressure sensor fail in a way which leaks pressurized air or other gas into the chamber 60, the lower body 20 and upper body 30 can contain this pressure and prevent leakage of air or other gas out of the tire 2.

The upper body 30 transitions from the rim 32 to the trunk 36 in a generally conical fashion and defining a window 34 for viewing into the chamber 60. At a minimum, this window 34 is at least partially transparent for viewing of the Bourdon tube 100 or other pressure sensor within the chamber 60. Optionally, other portions of the upper body 30 and lower body 20 can also be formed of transparent material. The window 32 transitions to the trunk 36 which extends to a collar 37 which in turn extends to a tip 38. The tip 38 defines a portion of the upper body 30 most distant from the rim 32 and most distant from the lower body 20. The various parts of the upper body 30 are each preferably substantially radially symmetrical about the central axis Z.

A receiver 40 is supported within the lower body 20 and along the central axis Z. This receiver 40 is particularly configured so that it can be coupled to a valve stem 4 of a tire 2, preferably in a semi-permanent fashion so that the gauge 10 can remain upon the tire 2 during use. The receiver 40 includes a cylindrical bore wall 42 with a diameter similar to that of the valve stem 4. An inlet 44 is located at an inner end of the receiver 40 which is open to a path within the column 70 and extending to the valve core 50, so that fill air can pass through the inlet 44, through the receiver 40 and into the valve stem 4 of the tire 2.

Most preferably, a post 45 is located adjacent the inlet 44. This post 45 is configured to depress a valve on the valve stem 4 so that fluid communication exists between the path within the column 70, through the inlet 44 and through the valve stem 4 into the tire 2. A cylinder 46 preferably extends beyond the inlet 44 with the cylinder 46 aligned with the central axis Z and extending toward the upper body 30. This cylinder 46 provides a convenient support for the column 70 so that the column 70 can be sandwiched between the lower body 20 and upper body 30 and surrounding the cylinder 46, while also captured at an opposite end by the upper body 30, so that fasteners are not required to capture the column 70 between the lower body 20 and the upper body 30.

Should the receiver 40 be required to attach to a valve stem 4 of a different size or configuration, the receiver 40 would be appropriately modified so that it could be effectively attached to any such alternative valve stem. The receiver 40 could include threads to thread onto the valve stem 4 or resilient liners such as of soft rubber which would allow for a tight friction fit between the receiver 40 and the valve stem 4 and a secure seal between the receiver 40 and the valve stem 4, so that leakage is precluded when the gauge 10 remains upon the valve stem 4 for prolonged periods.

The upper body 30 preferably includes the valve core 50 therein. In particular, the collar 37 of the upper body 30 has a hollow cylindrical form sized so that the valve core 50 can be press fit therein. The valve core 50 could alternatively be threaded into the collar 37 should appropriate threads be formed on the collar 37 or the valve core 50 or both.

The valve core 50 typically includes a needle adjacent the tip 38 coupled to a valve assembly 54 and spring biased with a spring 56 toward a closed position. When the needle 52 is depressed, the valve assembly 54 is opened. When forces are removed from the needle 52, the spring 56 causes the needle 52 to return to its original position and the valve assembly 54 to be closed. Various different forms of valve cores 50 are known, with many such suitable valve cores being effective for this invention. Most preferably, the valve core 50 has a form similar to that of a typical valve stem 4 of a tire 2, so that common hoses 8 can be readily coupled to the valve core 50 in the same manner that they would otherwise be coupled to the valve stem 4 of the tire 2. For instance, the valve core 50 can be configured to be compatible with a standard Schraeder fitting.

The chamber 60 is defined by an open region between portions of the lower body 20 and the upper body 30 and is generally circular in form in a mid portion of the gauge 10. This chamber 60 includes the Bourdon tube 100 or other pressure sensor therein. This chamber 60 is also preferably sealed sufficiently so that should the Bourdon tube 100 or other pressure sensor leak, this leak will not result in loss of air from the tire 2, but rather will be contained within the chamber 60.

The column 70 is configured as a generally hollow cylindrical construct extending from the cylinder 46 of the receiver 40 to the downstream end of the valve core 50. The column 70 defines a general form of path leading from the valve core 50 to the receiver 40 along which compressed air flows when the tire 2 is being filled through the gauge 10. This basic column 70 includes a cylindrical wall 72 oriented aligned with the central axis Z and substantially closed along the cylindrical wall 72 from a nose 74 adjacent the upper body 30 to a tail 76 adjacent the lower body 20. A side port 78 is formed in the column 70. This side port 78 provides a junction to which the Bourdon tube 100 or other pressure sensor can be attached so that a pressure of air within the tire 2 can be sensed.

The column 70 generally includes the features described above. Additionally, the column 70 of this first embodiment further includes details of the venturi sensor protector 80 therein. These details of the venturi sensor protector 80 are integrally formed with other portions of the column 70 described above in this first embodiment, but could alternatively be formed separately and merely added to the column 70. In other embodiments, the column 70 is modified as necessary to receive a different pressure sensor protector according to the different embodiments.

The venturi sensor protector 80 includes a divider wall 84 which divides the path between the valve core 50 and the receiver 40 into a bypass path 86 on one side of the divider wall 84 and a venturi space 88 on an opposite side of the divider wall 84. The divider wall 84 begins with a diagonal portion extending from the cylindrical wall 72 of the column 70. The divider wall 84 then transitions into a portion which extends in a fashion aligned with the central axis Z. The divider wall 84 terminates at a tip 85. Adjacent the tip 85 both the bypass path 86 and venturi space 88 come together. The venturi space 88 is located adjacent the side port 78 of the column 70 so that the divider wall 84 effectively isolates the side port 74 from the bypass path 86.

In operation, as high pressure air is rapidly flowing from the valve core 50 to the receiver 40 to fill the tire 2, this air is caused to pass along the bypass path 86 (along arrow A of FIG. 2) when passing through the column 70. The narrowing of the bypass path 86 further enhances a velocity of the air passing along the bypass path and adjacent the divider wall 84. In contrast, the venturi space 88 is characterized by static air. Through utilization of the Bernoulli Principle that pressure decreases with increased velocity, the venturi space 88 experiences a decrease in pressure due to the high velocity air passing along the bypass path 86 and past the tip 85 of the divider wall 84. The bypass path 86 would tend to suck air out of the venturi space 88 somewhat (along arrow B of FIG. 2) causing the reduced pressure within the venturi space 88.

A degree to which pressure within the venturi space 88 is less than pressure within the bypass path 86 is a function of the velocity of the air passing along the bypass path 86. Other factors including the geometry of the divider wall 84 and a geometry of the venturi space 88 and bypass path 86 can be selected by experimentation or calculation to optimize the pressure differential between the venturi space 88 and the bypass path 86. At a minimum, the venturi sensor protector 80 is preferably configured so that pressure within the venturi space 88 is sufficiently lower than pressure within the bypass path 86 so that pressure within the venturi space 88 is less than a maximum safe pressure for the pressure sensor, such as the Bourdon tube 100, even when fill air passing from the air compressor 6 through the valve core 50 and on to the receiver 40 is above a safe pressure for the Bourdon tube 100 or other pressure sensor. Rather, the Bourdon tube 100 or other pressure sensor would experience a lower pressure than that within the bypass path 86 and would remain safe.

During the filling procedure, the Bourdon tube 100 or other pressure sensor would be reading a lower pressure than exists within the bypass path 86, and a pressure which is at least partially correlated with a pressure within the tire 2. However, when the flow of air is stopped, such as by actuating a valve upon the hose 8 (FIG. 1) the stoppage of air within the bypass path 86 would cause an equilibrium condition between an interior of the tire 2 and the Bourdon tube 100 or other pressure sensor, so that an accurate reading could be obtained. If an undesirably low pressure still exists within the tire 2, the valve would then be reopened to further pass air into the tire 10. However, the hose 8 would never need to be removed from the gauge 10, and the gauge 10 would never need to be removed from the valve stem 4 of the tire 2.

Through experience or careful design of the venturi protector 80, it is conceivable that the venturi protector 80 could be appropriately configured and calibrated so that the Bourdon tube 100 or other pressure sensor would in fact read a pressure close to if not exactly the same as a pressure within the tire 10 even during the filling process and while elevated pressure air is flowing into the tire 2, so that the most rapid and accurate filling of the tire 2 would be achieved.

The pressure sensor coupled to the side port 78 of the column 70 is preferably in the form of the Bourdon tube 100. The Bourdon tube 100 is similar to those well known in the prior art consisting of a coil of metal with a hollow interior, and with walls of the coil sufficiently thin so that the coil becomes slightly unwound as increasing pressure within an interior of the coil is experienced. The Bourdon tube 100 can either spiral in a planar fashion (referred to as a radial spiral) or can spiral in a helical fashion (referred to as a helical spiral. The Bourdon tube 100 thus includes an inner end 102 coupled to the side port 78 and extends in a spiral fashion to an outer end 104. An indicator 106 is typically attached near the outer end 104.

Indicia are preferably provided adjacent the indicator 106 which provide particular pressure readings that are accurate when the indicator 106 is located adjacent those indicia. The indicia 62 (FIG. 1) could be painted or otherwise formed upon the window 34 of the upper body 30, or could be included upon a separate disc within the chamber 60 or upon portions of the lower body 20 so that they could still be viewed through the window 34 of the upper body 30. Alternatively, a separate sensor could generate an electronic signal based on a position of the indicator 106 so that the pressure indicated by the Bourdon tube 100 would be encodable into an electronic signal which could then be transmitted or caused to actuate a display to read out pressure values to a user. In more complex variations on the gauge 10, lights could be included or luminescent material utilized so that the indicia and indicator 106 could all be successfully read in low light or no light conditions.

Figure 7:
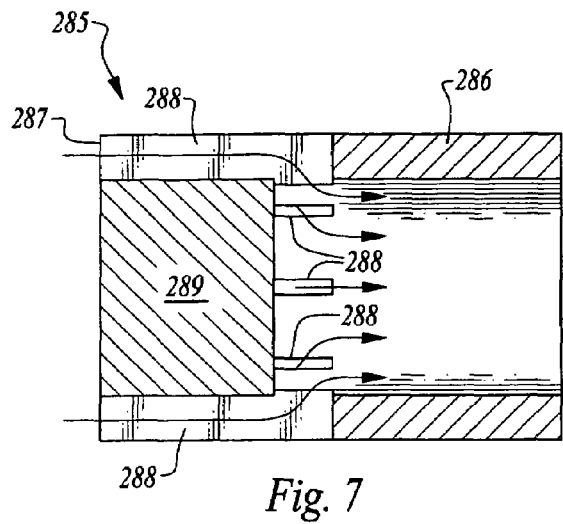
FIG. 7 is a full sectional view of a slide/spring of the embodiment of FIG. 6 oriented within the central column along the path between the valve core and the receiver of the gauge.
Figure 8:
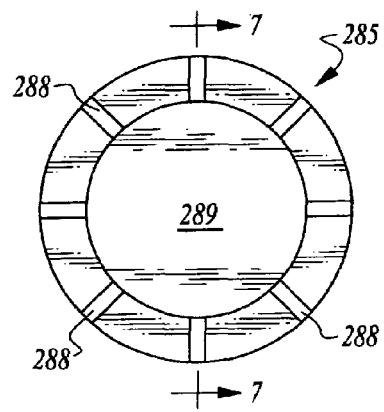
FIG. 8 is a left end view of that which is shown in FIG. 7.

With particular reference to FIGS. 6-8, particular details of a gauge 210 according to a second embodiment are described. With this gauge 210, the venturi protector 80 of the first embodiment is replaced with a slide/spring protector 280 for the sensor protector according to this embodiment. The slide/spring protector 280 resides within the column 70 and only details of the unique protector 280 are described, with other details of the gauge 210 similar to those of the gauge 10 of the first embodiment.

The slide/spring protector 280 includes a spring 282 located within the column 70 and abutting a shortened form of the cylinder 46 of the receiver 40. The spring 282 includes multiple turns 283 with gaps 284 therebetween in the general form of a helical compression spring 282. A slide 285 abuts an end of the spring 282 opposite the cylinder 46 of the receiver 40. The slide 285 (FIGS. 7 and 8) includes a side wall 286 which is cylindrical in form and particularly adapted to cover the side port 76 of the column 70 when the spring 282 is compressed sufficiently so that the side wall 286 is located adjacent the side port 78. When the side wall 286 is spaced from the side port 78, such as when the spring 282 is in its fully extended position, the side port 78 remains open.

The slide 285 includes an upstream end 287 which faces the valve core 50. Airflow slots 288 are formed in the upstream end 287 and extend down into the slide 285 preferably about half of an overall length of the slide 285. A plug 289 is provided at the upstream end 287 which extends into a hollow cylindrical interior of the slide 285 a distance short of a midpoint of the slide 285. Thus, the airflow slots 288 can pass around the plug 289 to pass from the upstream end 287 to the interior space bounded by the side wall 286 and on to the receiver 40.

The airflow slots 288 sufficiently constrict airflow and the upstream end 287 is sufficiently blunt that significant pressure forces are applied to the upstream end 287 of the slide 285. These forces cause the slide 285 to move downstream (along arrow C of FIG. 6) and cause the spring 282 to compress somewhat. The spring 282 is calibrated so that when the pressure of the air encountering the slide 285 is less than a maximum pressure for the pressure sensor, such as the Bourdon tube 100, the side wall 286 is not covering the side port 78 of the column 70. However, when this pressure encountered by the slide 285 is greater than a maximum safe pressure for the Bourdon tube 100 or other pressure sensor, the side wall 286 of the slide 285 covers the side port 78, through compression of the spring 282 and moving with the slide 285, so that such dangerously high pressure air or other gas cannot access the Bourdon tube 100 or other pressure sensor, and any such damage is avoided.

Figure 9:
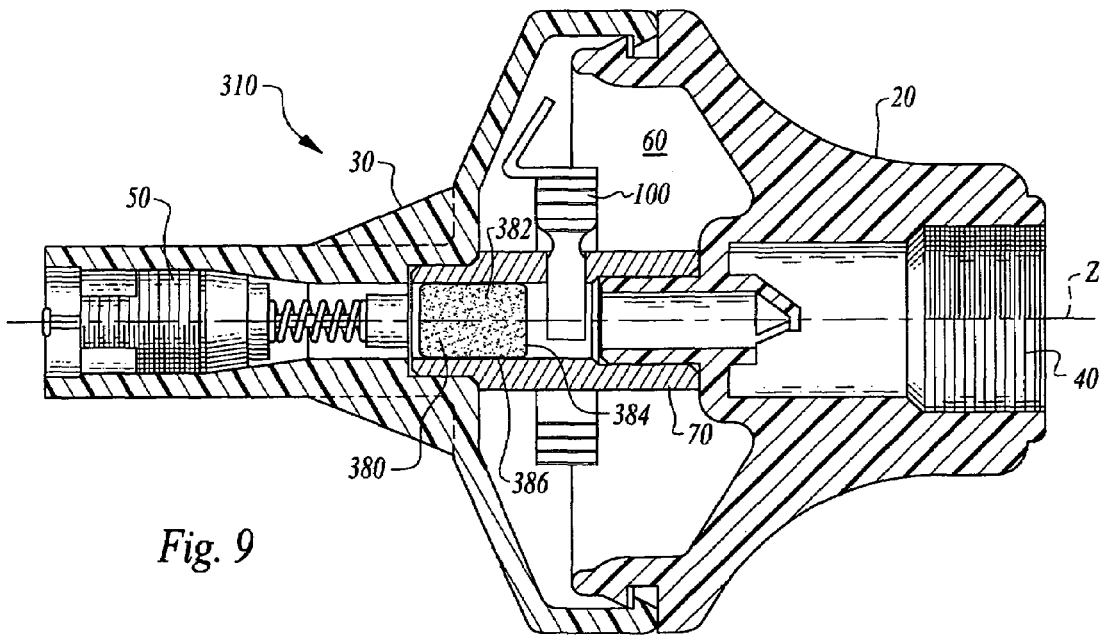
FIG. 9 is a full sectional view of a third embodiment gauge of this invention featuring a filter flow type pressure sensor protector.
Figure 10:
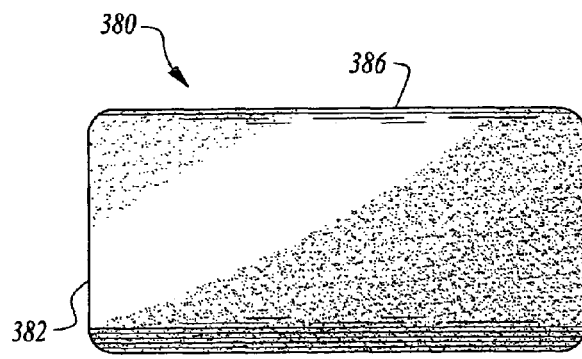
FIG. 10 is a full sectional view of the porous mass making up the filter flow sensor protector within the gauge of the third embodiment.
Figure 11:
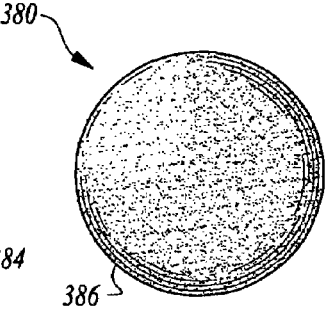
FIG. 11 is a right end view of that which is shown in FIG. 10.
Figure 12:
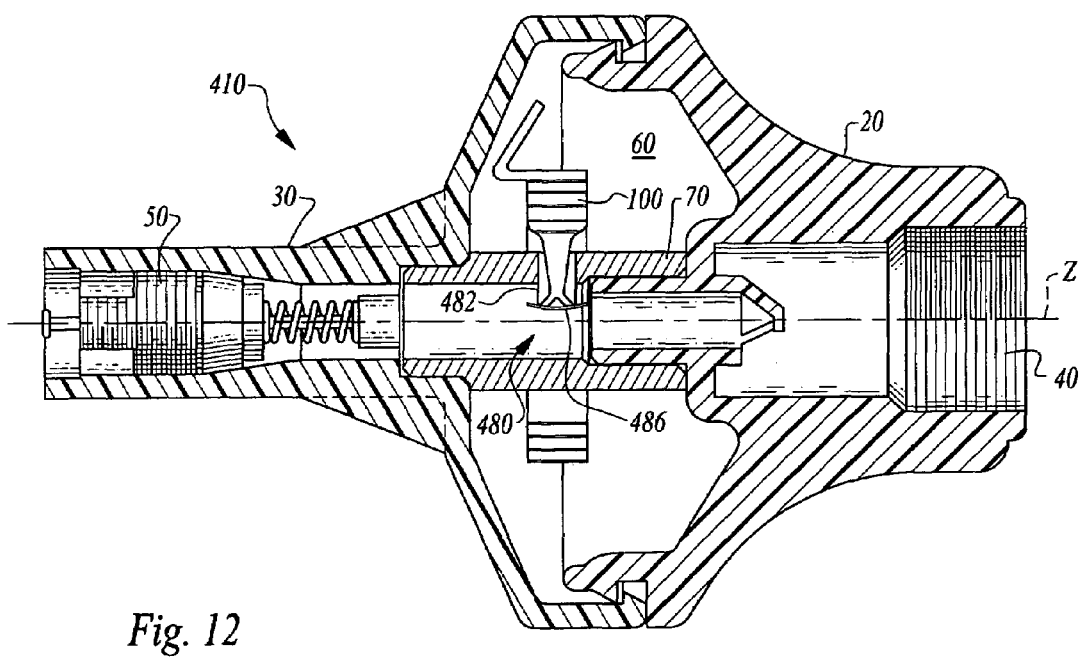
FIG. 12 is a full sectional view of a fourth embodiment gauge including a flexible plate pressure sensor protector therein.

With particular reference to FIGS. 9-11, particular details of a gauge 310 according to a third embodiment are described. The gauge 310 features a filter flow protector 380 substituting the venturi protector 80 of the gauge 10 of the first embodiment. Other details of the gauge 310 of the third embodiment are similar to those of the gauge 10 of the first embodiment.

In particular, the filter flow protector 380 is merely a mass of porous material extending from a first end 383 to a second end 384 and having a side surface 386 which is cylindrical and similar in diameter to an interior diameter of the column 70. The filter flow protector 380 is preferably located within the column 70 just upstream of the side port 78. This filter flow protector 380 is most preferably formed by taking stainless steel particles and cold pressing them together until they are bounded together. Alternatively, heat can be applied such that the particles are sintered together, or they could be coupled together through some form of adhesive. Other materials for the filter flow protector 380 could alternatively be utilized, such as brass, other metals or non-metal materials. This filter flow protector 380 would have numerous microscopic pathways extending from the first end 382 to the second end 384. However, none of these pathways would be straight. Rather, they would be tortuous and involve significant intimate contact against surface structures. Hence, a high degree of friction pressure losses would be encountered, particularly when relatively high flow rates are involved for air or other gases passing through the filter flow protector 380. The size of gaps between particles in the filter flow protector 380 would be selected based on the pressure and flow rates expected to be supplied by the air compressor 6 or other source of compressed air/gas and the safe range of pressures that can be experienced by the Bourdon tube 100 or other pressure sensor. The filter flow protector 380 would then be configured so that it causes a pressure loss which is sufficient so that after the air has passed through the filter flow protector 380, the pressure is now at a safe lower pressure which will not damage the Bourdon tube 100 or other pressure sensor.

While the filter flow protector 380 is preferably located upstream of the side port 78 and within the column 70, the filter flow protector 380 could alternatively be formed within the side port 78 of the column 70 itself or otherwise within the inner end 102 of the Bourdon tube 100, so that the path extending from the valve core 50 to the receiver 40 would not be blocked (or only partially blocked) by the filter flow protector 380, but rather only air passing into the Bourdon tube 100 or other pressure sensor would experience the pressure reduction associated with passage through the filter flow protector 380.

After fill air has been applied, and the air or other gas within the gauge 310 is no longer moving, pressure will reach equilibrium through the filter flow protector 380 relatively rapidly. The Bourdon tube 100 or other pressure sensor will then read accurate pressure once a static pressure condition exists within the tire 2 and gauge 310.

Figure 13:
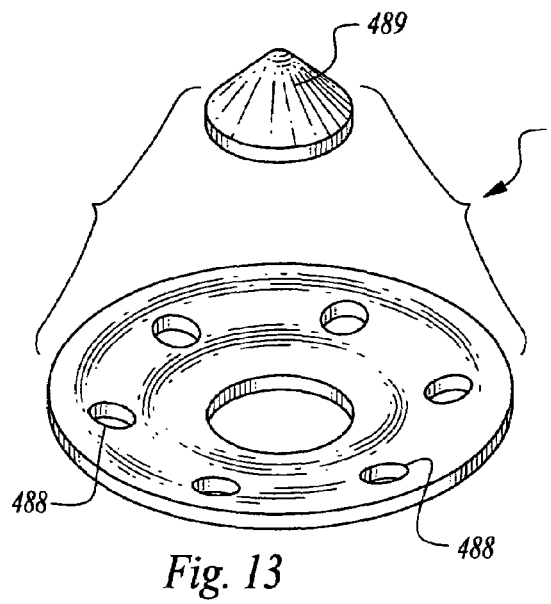
FIG. 13 is a detail of a portion of that which is shown in FIG. 12.
Figure 14:
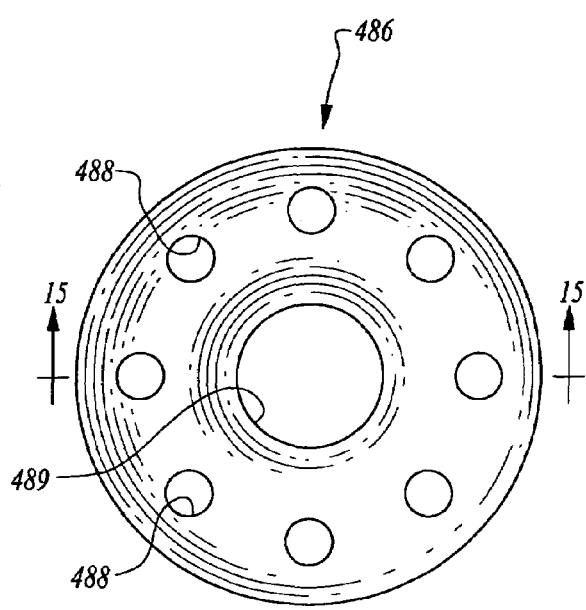
FIG. 14 is a plan view of a disc providing a preferred form of flexible plate according to this fourth embodiment gauge of this invention.
Figure 15:
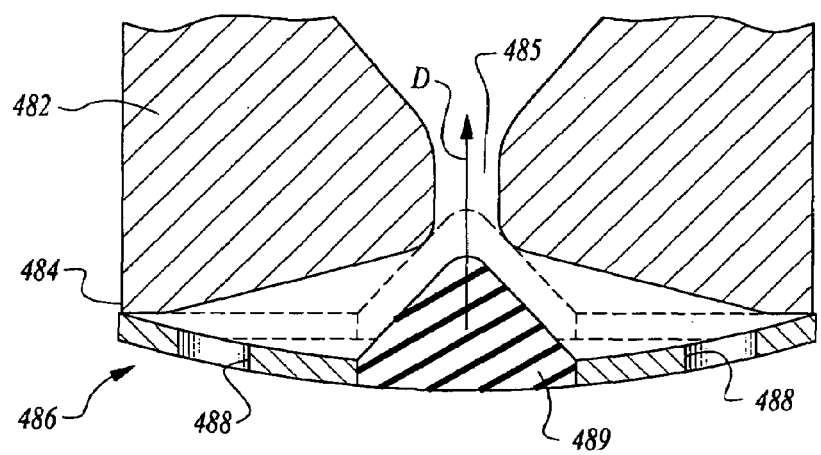
FIG. 15 is a side elevation view of that which is shown in FIG. 14, shown in full section.
Figure 16:
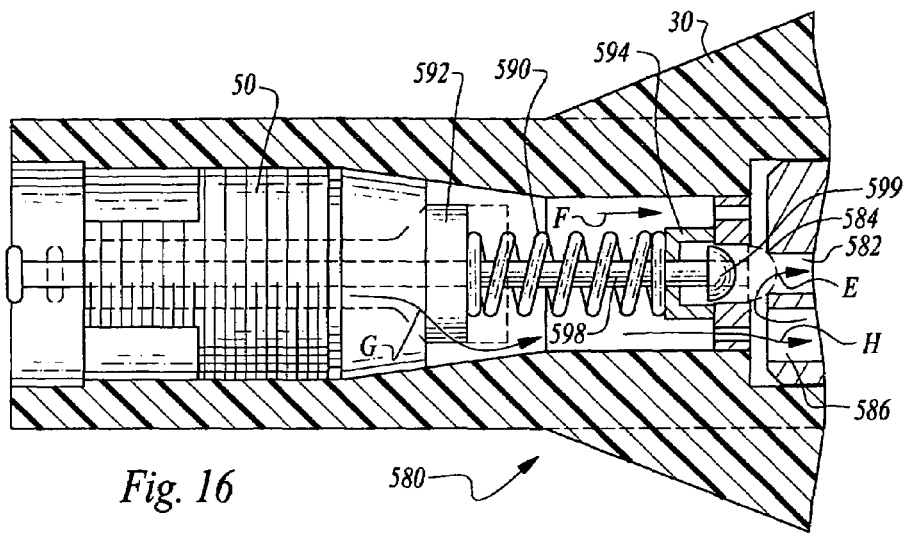
FIG. 16 is a detail of a portion of a fifth embodiment gauge shown also in FIG. 19.
Figures 17, 18:
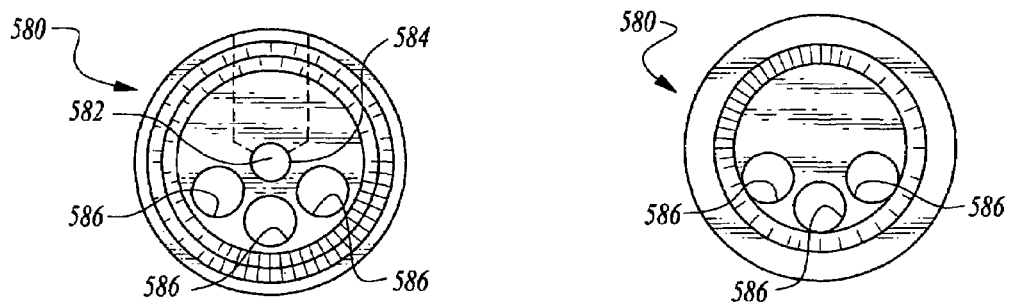
FIG. 17 is a sectional view taken along line 17-17 of FIG. 19.
FIG. 18 is a sectional view taken along line 18-18 of FIG. 19.
Figure 19:
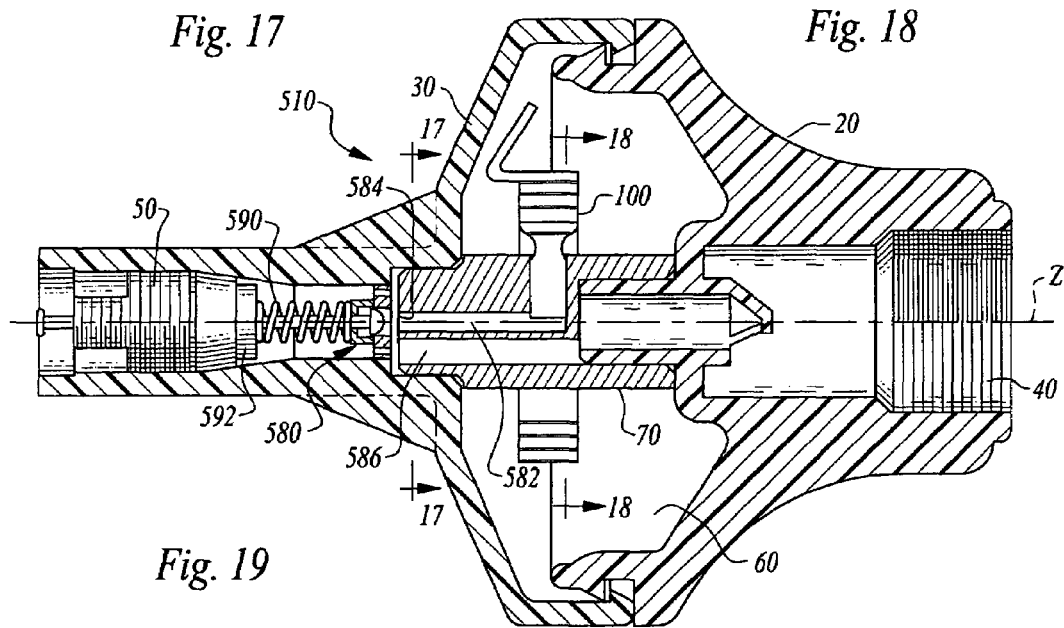
FIG. 19 is a full sectional view of the fifth embodiment gauge with a valve core actuated stopper for protection of the Bourdon tube or other pressure sensor.
Figure 20:
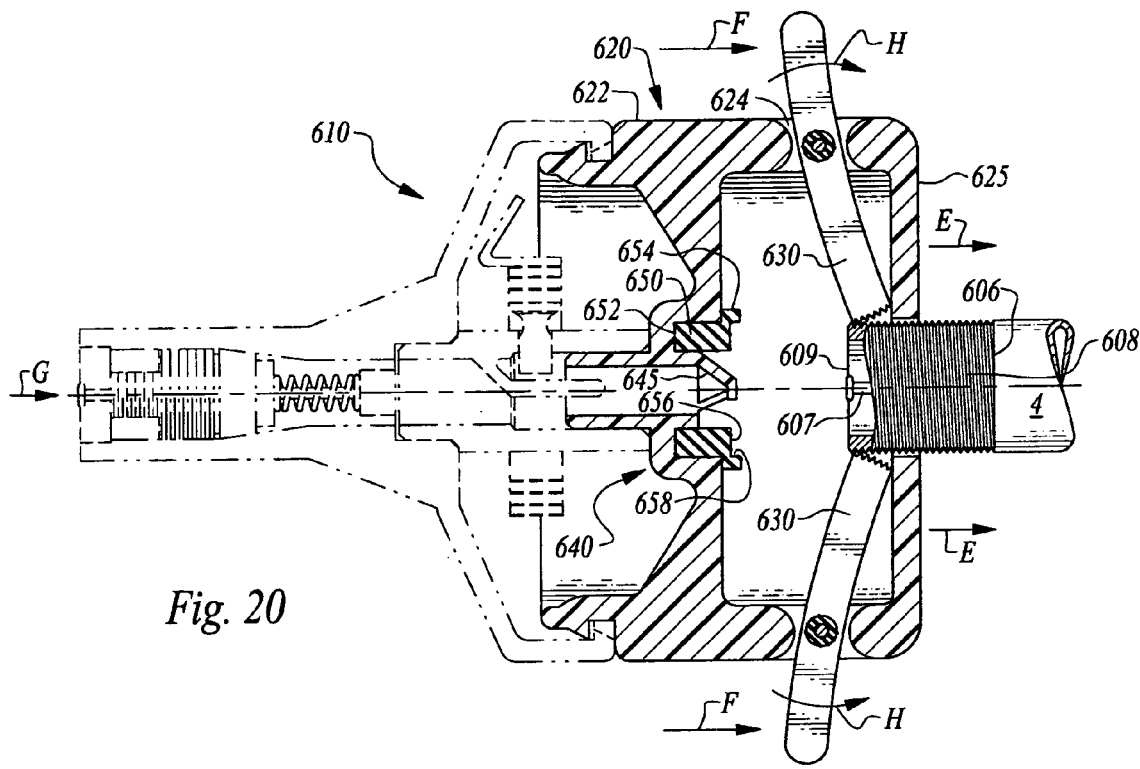
FIG. 20 is a full sectional view of a sixth embodiment gauge with a modified lower body configured with levers manually actuatable for temporary but secure mounting of the gauge to a valve stem, and with portions of the gauge common with previous embodiments shown in phantom.

With particular reference to FIGS. 13-15, details of a gauge 410 according to a fourth embodiment, and featuring a flexible plate protector 480 are described. Other details of the gauge 410 are similar to those of the gauge 10 of the first embodiment described in detail above. The flexible plate protector 480 is a protector placed over an extension tube 482 surrounding a side port 78 in the column 70 and leading to the Bourdon tube 100 or other pressure sensor. A free end 484 of this extension tube 482 defines an entrance 485 into the tube 482.

A restriction plate 486 is located adjacent the entrance 485 of the free end 484 of the extension tube 482. This restriction plate 486 is generally in the form of a circular disc according to the preferred embodiment and with a conical taper which is oriented so that it tapers away from the entrance 485 of the extension tube 482. Fill holes 488 pass through this restriction plate 486, allowing air or other gases to flow through the restriction plate 486 and into the extension tube 482 and on to the Bourdon tube 100 or other pressure sensor. A center of the restriction plate 486 includes a conical seal 489 therein which extends toward the entrance 485. The entrance has a diameter less than a diameter of the conical seal 489.

The entire restriction plate 486 is formed of a sufficiently flexible material and is sufficiently thin so that when a pressure differential is experienced between the outside of the extension tube 482 and inside of the extension tube 482, the restriction plate 486 flexes. If the pressure differential is sufficiently high, the conical seal 489 abuts the entrance 485 (arrow D of FIG. 15).

The design of the restriction plate 486 is carefully crafted so that only dangerously high pressure conditions cause the restriction plate 486 to transition to the closed position to protect the Bourdon tube 100 or other pressure sensor. Thus, once the tire 2 is filled and the source of dangerously high pressure air has been removed, the restriction plate 486 returns at least partially to its original position, so that air can pass through the flow holes 458 and further provide equilibrium both inside the extension tube 482 and outside the extension tube 482, and so that the restriction plate 486 can further return to its original position.

While the extension tube 482 is shown in this fourth embodiment extending perpendicular to the central axis Z, the extension tube 482 could include a bend therein or otherwise be configured so that it faces upstream either partially or completely, and with the restriction plate 486 at the free end 484 of the extension tube 482.

With particular reference to FIGS. 16-19, details of a gauge 510 according to a fifth embodiment are described. This gauge 510 is similar to the gauge 10 of the first embodiment (FIGS. 1 and 2) except that the venturi protector 80 of the first embodiment is replaced with the stopper protector 580 of the gauge 510. Details of the stopper protector 580 are described herein, with other portions of the gauge 510 preferably remaining similar to those described above with respect to the gauge 10 of the first embodiment, except where otherwise provided.

In particular, the stopper protector 580 includes the standard column 70 modified from its depiction in other embodiments to uniquely be substantially solid except where a tube path 582 passes, along the central axis Z, from an upstream side of the column to the side port where this tube path 582 provides access into the Bourdon tube 100 or other pressure sensor. This tube path 582 has a rim 584 surrounding an entrance into the tube path 582 at the upstream end of the column. While the tube path 582 is shown as being cylindrical, it could have other configurations so long as it provides for fluid flow from the rim 584 to the Bourdon tube 100 or other pressure sensor.

At least one side bore 586, and preferably three (or more), passes entirely through the column along paths separate from the tube path 582. These side bores 586 pass entirely through the column so that air or other gases are allowed to pass entirely from the valve core 50 to the receiver 40 of the gauge 510.

The stopper protector 580 includes the valve core 50 modified slightly from other embodiments to allow for selective blockage of the tube path 582 at the rim 584. In particular, a core spring 590 is provided as part of the valve core 50 which extends from a valve plug 592 at an upstream side of the core spring 590 to a base 594 at a downstream end of the core spring 590. The base 594 abuts against a ledge 595 formed as part of the upper body 30 of the gauge 510. Thus, the base 594 is held against the ledge 594 when the valve core 50 is press fit into the upper body 30. The valve plug 592 is usually pressed against the valve assembly of the valve core 50 through action of the core spring 590. However, when the needle of the valve core 50 is depressed, this valve plug 592 is opened and the core spring 590 is compressed somewhat. Air can then pass around the valve plug 592, such as high pressure fill air, to pass through the gauge 510 from the valve core 50 to the receiver 40 (along arrow G of FIG. 16).

Before this core spring 590 is compressed through translation of the needle of the valve core 50 (along arrow F of FIG. 16), the core spring 590 biases the valve plug 592 towards its closed position so that fill air cannot pass into the gauge 510 and so that leakage of compressed air from the tire through the valve core 50 is prevented. The needle extends through the valve plug 592 and continues on as a rod 598 passing along the central axis Z and through the core spring 590. This rod 598 also passes through the base 594 and terminates at a stopper 599. This stopper 599 is located slightly away from the rim 584 of the tube path 582 when the needle of the valve core 50 is not depressed. Thus, the tube path 582 is in open relationship with the interior of the tire 2 through the side bores 586 and through the rim 584 of the tube path 582 (along arrow E of FIG. 16). When the valve core 50 is closed the Bourdon tube 100 or other pressure sensor is in communication with an interior of the tire 2 through the gauge 510 so that an accurate pressure reading can be provided.

When the valve core 50 is opened and the needle is displaced (along arrow F of FIG. 16) so that the core spring 590 is compressed, the rod 598 is translated (also along arrow F of FIG. 16) until the stopper 599 abuts the rim 584 of the tube path 582. The stopper 599 seals the tube path 582, blocking off access to the Bourdon tube 100 or other pressure sensor. At this same time, the valve plug 592 is opened so that fill air can pass through the valve core 50, through the side bores 586, through the receiver 40 and on to the tire 2 (FIG. 1) or other compressed air filled chamber.

The base 594 provides for proper alignment of the rod 598 so that the stopper 599 remains aligned with the rim 584 of the tube path 582. The base 594 also supports one end of the core spring 590. The base 594 also includes holes passing therethrough, or the ledge 595 includes holes 596 passing therethrough so that when the valve core 50 is open with the valve plug 592 moved away from the valve assembly of the valve core 50 and compressed air is allowed to pass through the valve core 50, it can pass through either the base 594 or the ledge 595, so that it can access the side bores 586 and pass on to the receiver 40 and tire (along arrow H of FIG. 16).

While the stopper protector 580 provides a preferred form of sensor protector for the gauge 510, other valve core 50 actuated stoppers or other valves could be provided to seal off access to the Bourdon tube 100 or other sensor in conjunction with opening of the valve core 50 and translation of the needle thereof. For instance, the needle of the valve core 50 could merely be extended and coupled directly to a slide such as the slide 285 of the slide spring protector 280 associated with the gauge 210 (FIG. 6). With such an arrangement, translation of the needle of the valve core 50 would merely cause the slide 280 to translate along the central axis Z (along arrow C of FIG. 6) until the slide blocks the port leading to the Bourdon tube 100 or other pressure sensor.

With particular reference to FIGS. 20-24, details of a sixth embodiment gauge 610 featuring temporary attachment are described. This temporary attachment gauge 610 is preferably only different from previous embodiments within a modified lower body 620 of the gauge 610. Other portions of the gauge 610 are shown in phantom and could be configured to correspond with any of the previous embodiments of this invention or other gauge structures of other known prior art or future developed gauge structures.

The modified lower body 620 is particularly configured to facilitate temporary but secure attachment of the gauge 610 to the valve stem 4 of a tire 2. Such a construction facilitates use of a single temporary attachment gauge 610 on a first tire to be evaluated and/or filled, and then having the gauge 610 be readily removable and reattached to a separate tire for evaluation of the second tire, and so on. Thus, the gauge 610 is optimized for use as a single gauge on a multiple tire vehicle. When the gauge 610 is mounted to the valve stem 4 of the tire 2, the gauge 610 is sufficiently securely attached to the valve stem 4 that the method for use of this invention described in detail above can be fully utilized. The gauge 610 is then readily removed and the process repeated on a separate tire for evaluation of the second tire and/or filling thereof.

Details of the modified lower body 620 are shown in FIGS. 20-24. The modified lower body 620 is preferably configured so that it can be interchanged with upper bodies of other gauges without modification to the upper gauges bodies such as those described in previous embodiments hereinabove. The modified lower body 620 includes an outer wall 622 which preferably extends substantially cylindrically away from the upper body down to a floor 625. A pair of windows 624 are preferably provided on opposite sides of the outer wall 622 and approximately midway between the floor 625 and an end of the outer wall 622 where the lower body 620 interfaces with the upper body. While a pair of windows 624 are provided according to the preferred embodiment, it is conceivable that a single window 624 could be provided in embodiments where only a single lever 630 is utilized. Also, the outer wall 622 need not necessarily be cylindrical in form, but rather could be conical, frustoconical, rectangular in cross-section or have any other geometric form for optimum appearance, manufacturability or other design concerns. The modified lower body 620 is preferably substantially rigid so that it can adequately rotatably support the levers 630 described in detail below.

The levers 630 provide a preferred form of latching element for temporarily but securely mounting the gauge 610 upon the valve stem 4. In particular, the levers 630 preferably have an elongate form between an outer end 634 and an inner end 635. An axle 632 passes through the lever 630 between the outer end 634 and the inner end 635, and the axle 632 is then pivotably coupled to the outer wall 622.

Most preferably, the axle 632 is not directly rotatably attached to the outer wall 622 of the lower body 620. Rather, a grommet 633 is preferably provided into which the axle 632 passes, with the grommet 633 securely held by the outer wall 622 of the lower body 620. This grommet preferably entirely surrounds the axle 632 and either passes through the lever 630 about the axle 632, or a pair of grommets 633 are provided on either side of the lever 630 where the axle 632 is supported by the outer wall 622 of the lower body 620.

The grommet 633 is preferably formed of a resilient material. In this way, when translational forces are encountered between the lever 630 and the outer wall 622, the grommet 633 can resiliently flex somewhat, allowing the axle 632 to slightly translate linearly and perpendicular to a long axis of the axle 632. However, such translation of the axle 632 is resisted by the grommet 633 to some extent, so that the lever 630 remains tight against the valve stem 4 and the axle 632 remains centered within the grommet 633, except when translational forces are exerted upon the axle 632.

The inner ends 635 of the levers 630 preferably include teeth 636 thereon. These teeth 636 are preferably provided upon a substantially flat surface, but most preferably a very slightly curving surface. The teeth 636 are preferably provided with a pitch and major and minor diameters which match the pitch and major and minor diameters of threads 608 on a head 606 of the valve stem 4. The levers 630 have a length which causes the teeth 636 to be adjacent the threads 608 of the valve stem 4 when the gauge 610 is placed adjacent the valve stem 4.

When the gauge 610 is to be secured to the valve stem 4, the following process is followed. The gauge 610 is initially translated (along arrow E of FIG. 20) until a receiver 640 of the gauge 610 has its inlet 644 and post 645 aligned with a needle 607 within the head 606 of the valve stem 4 axially, but spaced away from the receiver 640. Next, the levers 630 are pushed (by manual forces such as those applied by fingers of a user along arrow F of FIG. 20). These lever 630 pushing forces cause the levers 630 to be rotated (about arrows H of FIG. 20). Most preferably, the gauge 610 is simultaneously pushed, such as upon the valve core of the upper body (arrow G of FIG. 20) to further facilitate the mounting process.

As the levers 630 rotate, the teeth 636 on the inner ends 635 are brought into closer and tighter engagement with the threads 608 of the valve stem 4. As the levers 630 reach a substantially horizontal orientation perpendicular to a long axis of the valve stem 4, this engagement force is at a maximum, requiring maximum rotational forces on the levers 630 and translational forces by pushing on the gauge 610, such as through pushing on the valve core of the upper body (along arrow G). Further rotation of the levers 630 then requires a lesser force after the levers 630 pass beyond a horizontal orientation.

Because the levers 630 are preferably substantially rigid and the outer wall 622 of the modified lower body 620 is also preferably substantially rigid, the grommet 633 provides a resilient coupling between the levers 630 and the outer wall 622 which can be flexed somewhat as the levers 630 pass through a horizontal orientation and position of maximum force. The levers 630 thus act as a form of toggle mechanism with the gauge 610 tending to "snap" onto the valve stem 4 during the mounting process described above.

Figure 21:
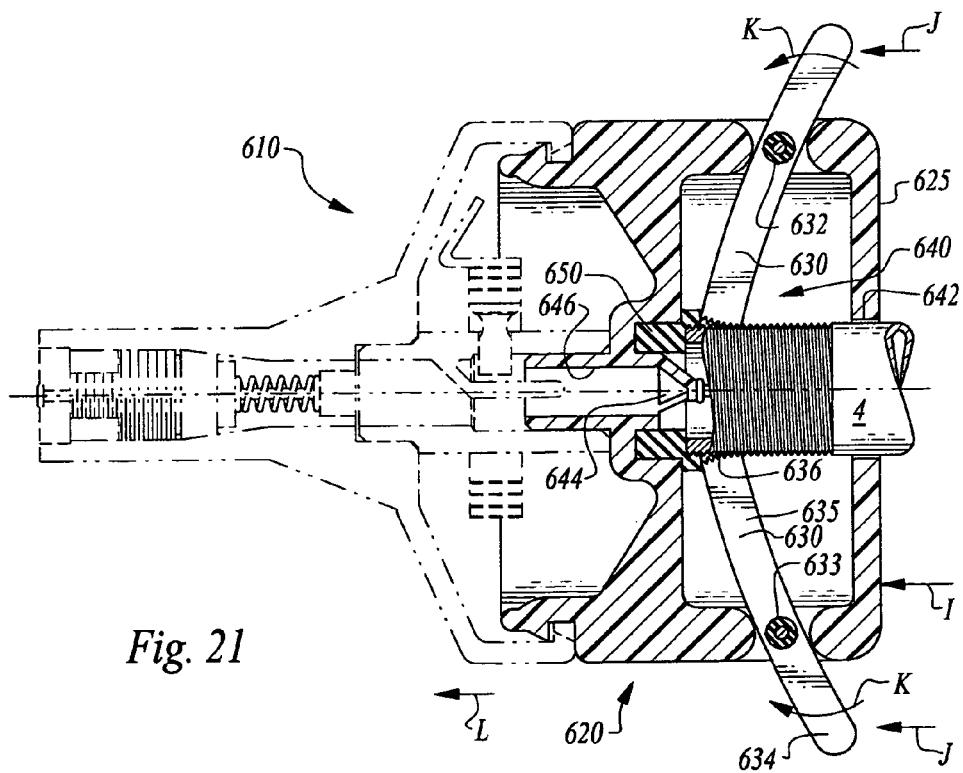
FIG. 21 is a full sectional view similar to that which is shown in FIG. 20 but after complete mounting of the gauge on to the valve stem.
Figure 22:
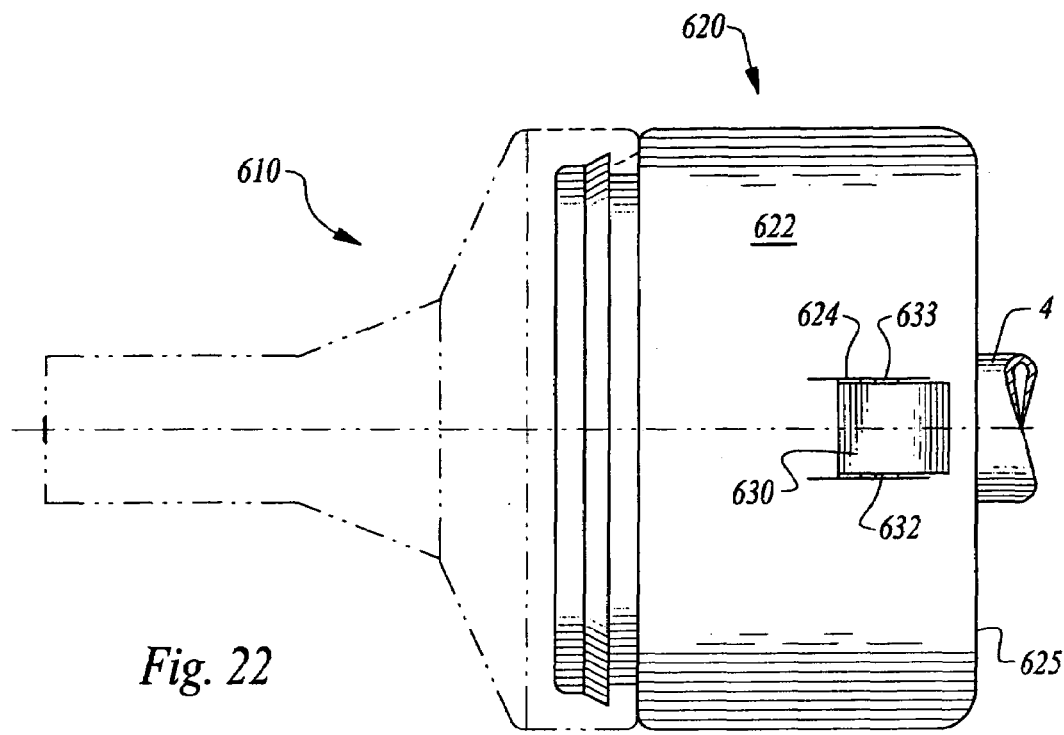
FIG. 22 is a side elevation view of that which is shown in FIG. 20, and further revealing details of how the levers extend out of the housing of the gauge.
Figure 23:
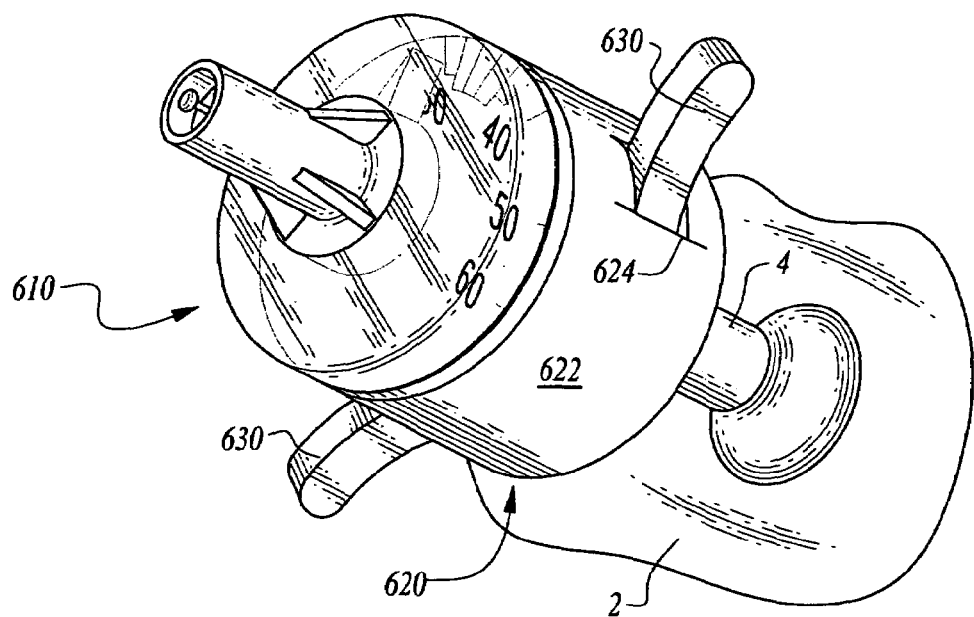
FIG. 23 is a perspective view of that which is shown in FIG. 20.

This process is reversed for removal of the gauge 610 as shown in FIG. 21. In particular, the user optionally but preferably provides a lifting force on the floor 625 (along arrow I of FIG. 21). The user simultaneously preferably pulls on the levers 630 with fingers of the user, such as along arrows J of FIG. 21. This lever 630 pulling causes the levers 630 to rotate, about arrow K of FIG. 21. The combination of lever rotation along arrow K and lifting of the floor 625, along arrow I, causes the entire gauge 610 to be lifted off of the valve stem 4, along arrow L of FIG. 21. The gauge 610 can then be reused on a separate valve stem 4 when desired or placed in secure storage until the gauge 610 is again required to be utilized. To ensure that the levers 630 are positioned where desired for mounting of the gauge 610, a biasing device is preferably provided tending to force the inner ends 635 toward the floor 625. For instance, such a biasing device could be a spring or a resilient bushing pressing against the inner ends 635 and urging the inner ends 635 toward the floor 625, except when rotation of the levers 630 causes the biasing device to be compressed.

The levers 630 are preferably also biased so that the inner ends 635 of the levers do not readily come fully into contact with the floor 625 of the lower body 620. Rather, preferably a resilient spacer is provided adjacent the floor 625 against which the inner ends 635 of the levers 630 abut when the inner end 635 of the levers 630 are rotated so that the inner ends 635 are close to the floor 625. Because this spacer is resilient in form, a user can exert rotational forces upon the levers 630 to cause the inner ends 635 to compress the resilient spacer so that the inner ends 635 of the levers 630 can come closer to the floor 625. The levers 630 preferably have a length which causes the inner ends 635 to be slightly spaced off of the threads 608 of the valve stem 4 when the levers 630 are fully rotated so that the inner ends 635 compress this resilient spacer and come close to contact with the floor 625. When the levers 630 are in their natural positions spaced by the resilient spacers away from the floor 625 slightly, the teeth 636 at the inner ends 635 of the levers 630 are at an appropriate position for engagement of the threads 608 of the valve stem 4.

If it is desired to have the direction of rotation of the levers 630 reversed so that pulling up on the levers 630 causes the levers 630 to lock the valve stem 4 against the gauge 610, and pushing on the levers 630 causes the levers 630 to push the gauge 610 off of the valve stem 4, such a reversing of the action of the levers 630 can be provided by appropriate modification of the levers 630. For instance, the levers 630 could be modified from being a single rigid structure into being a two part structure with the two parts pivoted together. The first part would be engaged by fingers of a user and have the same pivot point relative to the outer wall 622 of the modified lower body 620. The second part would include the teeth 636 and the inner ends 635 thereon. This second part would be pivotably supported relative to the lower body 620, such as by a pivot point supported off of the floor 625. This pivot point would be in between the inner end 635 and the portion of the second part of the lever where it is pivotably attached to the first part of the lever. Such an arrangement would cause reversing of the action of the inner ends 635 relative to the outer end 634. In such an arrangement the installation of the gauge 610 would occur as described above except that the user would pull rather than push on the levers during installation of the gauge 610 and push rather than pull on the levers during removal of the gauge 610 off of the valve stem 4.

Figure 31:
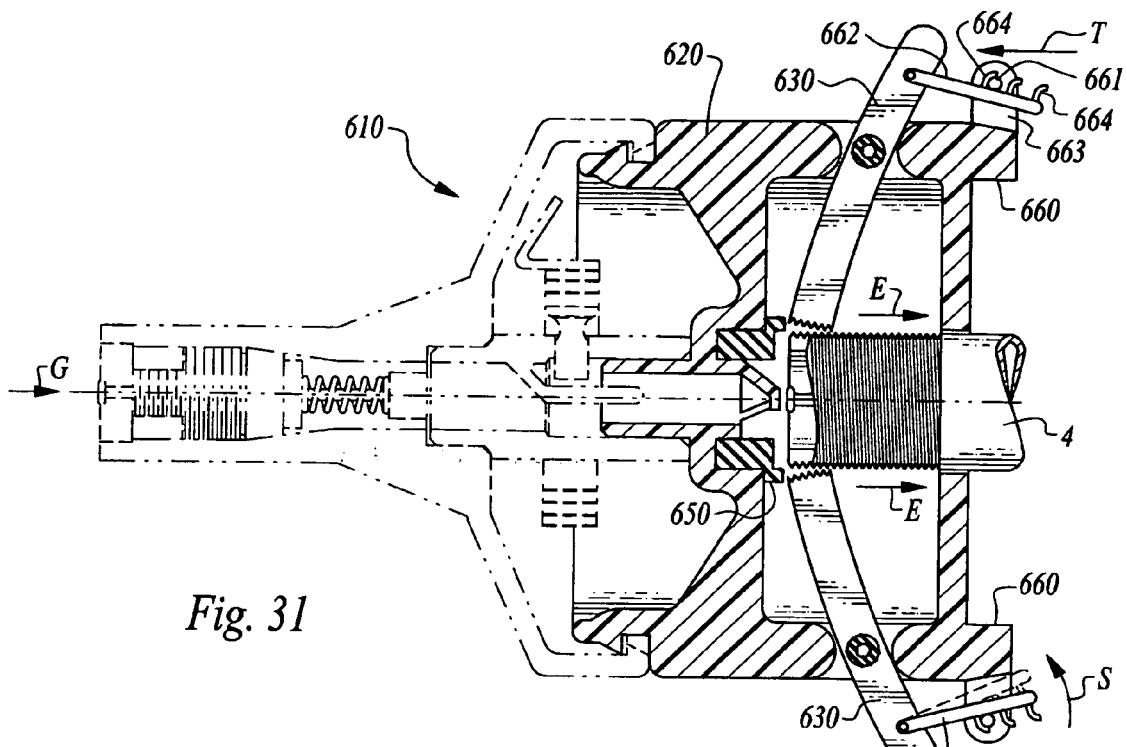
FIG. 31 is a full sectional view of the gauge of this invention in an embodiment where the levers include ratchets to lock the levers in various positions.

With particular reference to FIGS. 31-34, a modification to the levers 630 of the gauge 610 are described. With these modifications, various forms of ratchets 662, 672 are provided to further lock the levers 630 and otherwise lock the gauge 610 securely onto the valve stem. In particular, and with particular reference to FIGS. 31 and 32, the levers 630 have been modified compared to previous embodiments so that a pair of ratchets 662 can be utilized to lock the lever 630 in the position locking the gauge 610. In FIG. 31 the levers 630 are shown in an initial position as the gauge 610 is being placed onto the valve stem 4. As the gauge 610 is placed over the valve stem 4, force is applied, such as along arrow G, to move the gauge 610 onto the valve stem 4, along arrow E. The levers 630 are simultaneously pulled upward, along arrow T. This causes the levers 630 to rotate and for toothed inner ends of the levers 630 to be brought into engagement with the threads of the valve stem 4. The toothed inner ends can snap passed the threads of the valve stem 4 somewhat as the levers 630 get tighter.

The ratchet 662 includes teeth 664 thereon. The gauge 610 is modified so that the lower body 620 includes a pair of wings 660 directly below the levers 630. These wings 660 include posts 661 which cross a gap 663. While a single wing 660 could be provided adjacent each lever, most preferably a pair of wings 660 are provided adjacent each lever and with the gap 663 directly below the lever 630 and with the post 661 spanning the gap 663 between the wings 660. The ratchet 662 passes through this gap 663 between the wings 660. Because the teeth 664 are biased in a downward direction, lifting of the levers 630 along arrow T allows the ratchets 662 to easily pass the posts 661. However, if the levers 630 are for any reason inclined to move downward in a direction opposite that of arrow T, and loosening the lever 630 engagement of the valve stem 4, the teeth 664 on the ratchet 662 engage the post 661 and prevent further movement of the levers 630 in a downward direction opposite that shown by arrow T. The ratchets 662 are preferably biased toward the post 661. However, they can be pivoted away from the post 661, to the position shown by ratchet 662' (along arrow S of FIG. 31), to clear the teeth 664 from the post 661 and allow the levers 630 to again move back down in a direction opposite that of arrow T, such as when the gauge 610 is to be reused.

Figure 32:
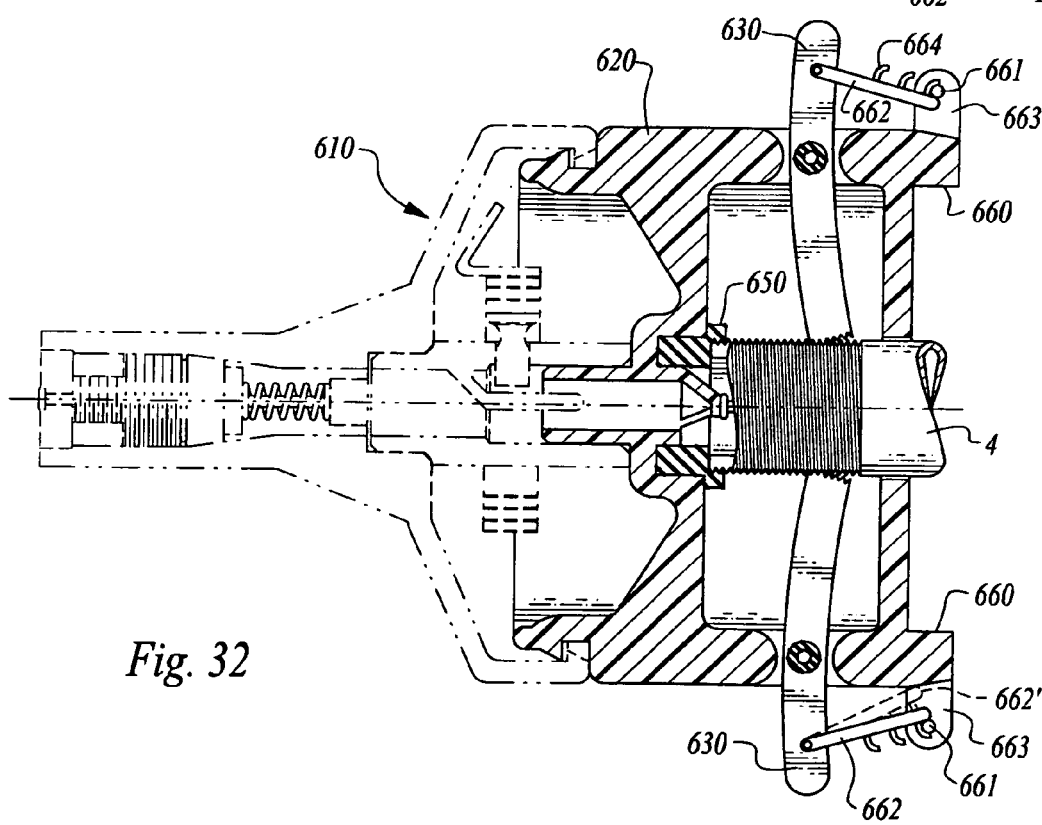
FIG. 32 is a full sectional view similar to that which is shown in FIG. 31, but with the gauge installed upon the valve stem and with the levers locked by the ratchets.

During use of the levers 630 by lifting the levers along arrow T, the levers 630 will transition to the orientation shown in FIG. 32. The ratchets 662 and associated teeth 664 engage the post 661 to support the levers 630 in the tight position shown in FIG. 32, with the valve stem 4 securely held against the compression washer 650 within the gauge 610.

Figure 33:
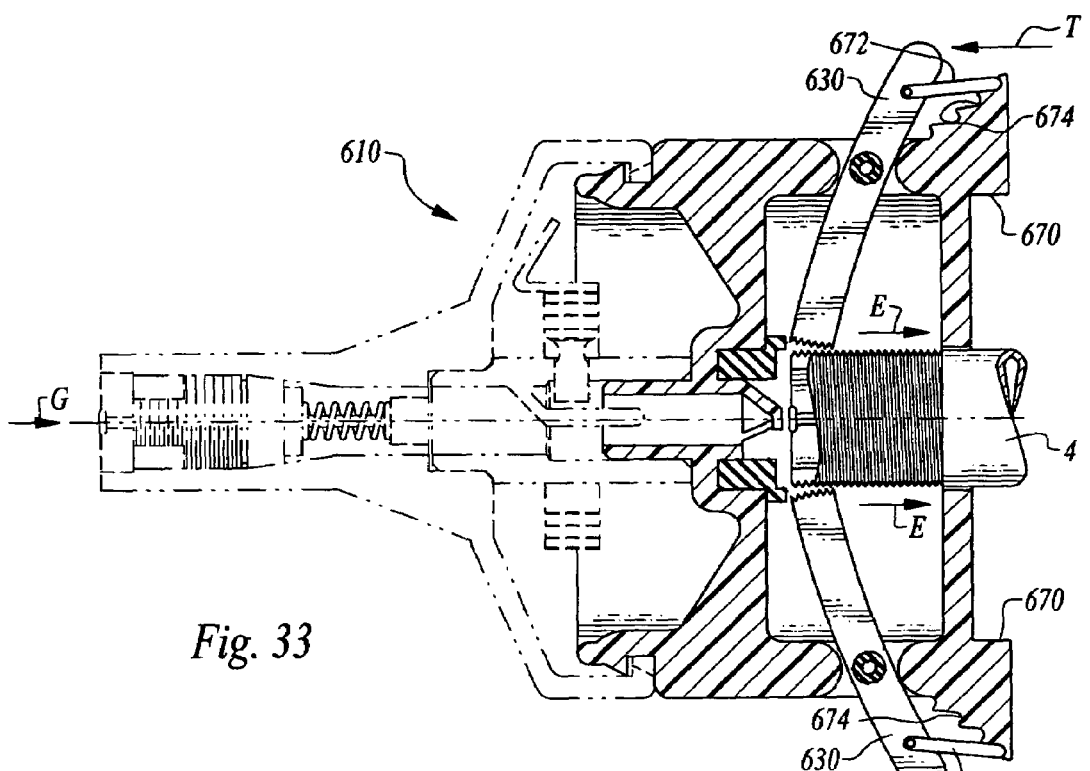
FIG. 33 is a full sectional view of an alternative embodiment of that which is shown in FIG. 31, which shows an alternative ratchet mechanism for locking of the levers.
Figure 34:
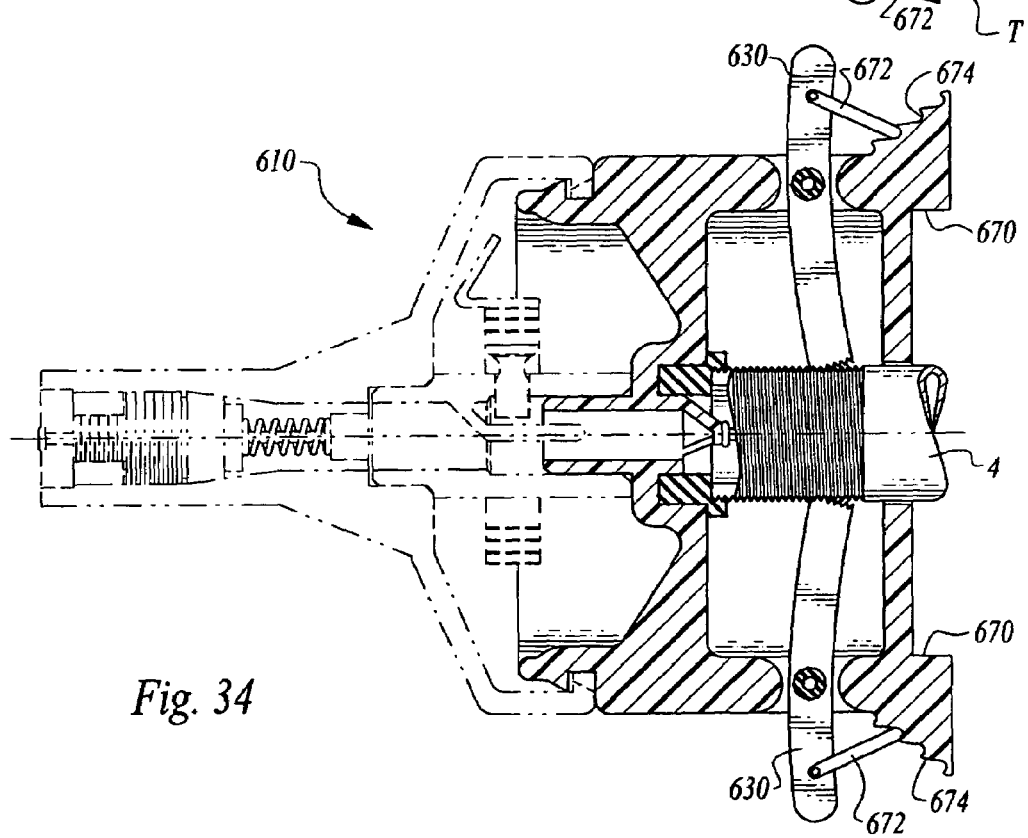
FIG. 34 is a full sectional view of the embodiment of FIG. 33, but with the gauge installed upon the valve stem and the levers locked.

A variation on the ratchets 662 of FIGS. 31 and 32 is to utilize the ratchet 672 shown in particular in FIGS. 33 and 34. In particular, the wings 660 of FIGS. 31 and 32 are replaced with feet 670. These feet 670 include teeth 674 on an upper surface thereof. A ratchet 672 is provided similar to the ratchet 662, except that no teeth are provided on the ratchet 672. The ratchet 672 merely engages the teeth 674 on the feet 670 as the levers 630 are lifted (along arrow T of FIG. 33) and while simultaneously pushing the gauge 610 down onto the valve stem 4, such as by applying force along arrow G. The ratchets 672 are preferably biased to be in their most outward position (shown in FIG. 33). However, these ratchets 672 can be easily slid inward to act as a locking mechanism to lock the levers 630 and provide further support for the gauge 610 to hold the gauge 610 securely upon the valve stem 4. As an alternative, the ratchets 672 could be unbiased and still function effectively.

Another alternative embodiment of the gauge 610 could conceivably replace the levers 630 with toothed wheels generally in the form of spur gears. These wheels would be rotatably mounted about the same axle 632 and would have a radius similar to a distance from the axle 632 to the location where the valve stem 4 is located when adjacent the gauge 610. To allow this wheel to be smaller in diameter, the axle 632 location and associated outer wall 622 would be brought in closer to the location where the valve stem 4 is located. A small portion of the wheel would extend out through the outer wall 622 so that it could be rotated by fingers of a user, either to cause the teeth on the wheel to engage the threads on the valve stem 4 for drawing the gauge 610 more tightly onto the valve stem 4, or in the opposite direction for rotation of the wheel to encourage the gauge 610 off of the valve stem 4. The wheel could be biased or configured with two-way added friction (which could be sufficiently provided by the grommet alone) as necessary to lock the wheels and hold the gauge 610 in place.

Portions of the gauge 610 other than the modified lower body 620 are preferably similar to those described above in previous embodiments. To facilitate the details of the modified lower body 620, however, the receiver 640 is preferably slightly modified. In particular, the receiver 640 includes an entry hole 642 through which the valve stem 4 is initially inserted. The receiver 640 includes an inlet 644 and post 645 corresponding with the inlet 44 and post 45 of previous embodiments. The inlet 644 and post 645 are supported upon a cylinder 646 which interfaces with other portions of the gauge 610 described in detail above with other embodiments. With this configuration, various different over-pressure protection devices such as those described in previous embodiments can be readily utilized with the temporary attachment gauge 610 of this embodiment.

A compression washer 650 provides a preferred form of seal which is preferably located adjacent the receiver 640 so that the compression washer 650 is sandwiched between a rim 609 of the head 606 of the valve stem 4 and the receiver 640 when the receiver 640 interfaces with the valve stem 4. In particular, the compression washer 650 preferably includes an upper ring 652 and a lower ring 654 joined together. The upper ring 652 is preferably generally cylindrical in form and sized to fit surrounding the inlet 644 and post 645 of the receiver 640. The lower ring 654 preferably has a slightly larger diameter than the upper ring 652 so that a face 654 is provided at this transition and defining a lowermost portion of the upper ring 652 against which the rim 609 of the valve stem 4 can sealingly abut.

A side wall 658 of the lower ring 654 faces inwardly and is circumferential in form. This side wall 658 preferably has a diameter similar to that of the head 606 of the valve stem 4 for further secure attachment to the valve stem 4. This side wall 658 can be truly cylindrical in form or can be tapered slightly in a frustoconical fashion so that it is slightly narrower in diameter adjacent the upper ring 652. The lower ring 654 is shown being rather short in FIGS. 20, 21 and 24. Alternatively, this lower ring 654 can be slightly longer for the embodiment of FIGS. 20-24, or can be configured as a long lower ring 754 in the embodiments of FIG. 25-28.

The compression washer 650 is most importantly formed of a resilient material which is capable of sealing when compressed to prevent air leakage between the valve stem 4 and the receiver 640, when the receiver 640 and valve stem 4 interface with each other. For instance, the compression washer 650 can be formed from rubber or other materials commonly used in forming O-rings or gaskets. Through actuation of the lever 630, the rim 609 of the valve stem 4 is caused to be pressed against the compression washer 650 at the face 656 and within the side wall 658. This compression of the compression washer 650 causes a tight seal between the receiver 640 and the valve stem 4. When rotation of the levers 630 occurs in the opposite direction (FIG. 21) the valve stem 4 is moved away from a compression washer 650, facilitating removal of the gauge 610.

Figure 24:
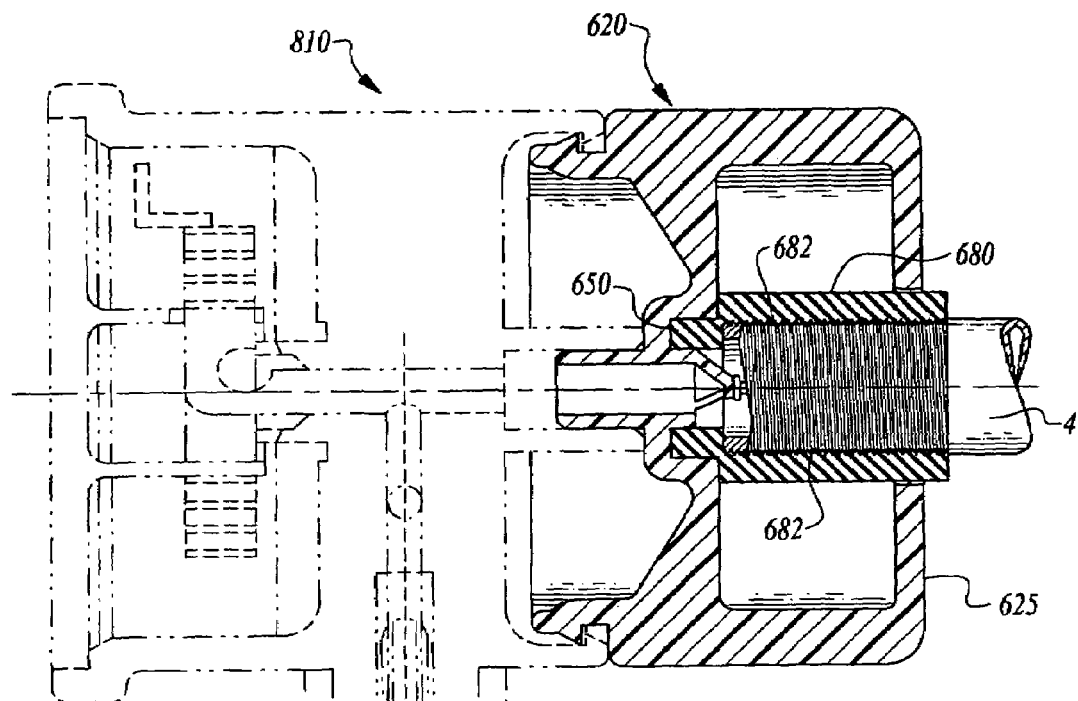
FIG. 24 is a full sectional view of an alternative embodiment of that which is shown in FIG. 20 with portions in phantom revealing how the gauge of this invention can be provided in a right angle configuration where a valve core of the gauge is oriented with a central axis perpendicular to the valve stem of the tire and perpendicular to a center line of a face with a lens therein, through which the Bourdon tube or other pressure sensing element is provided.
Figure 25:
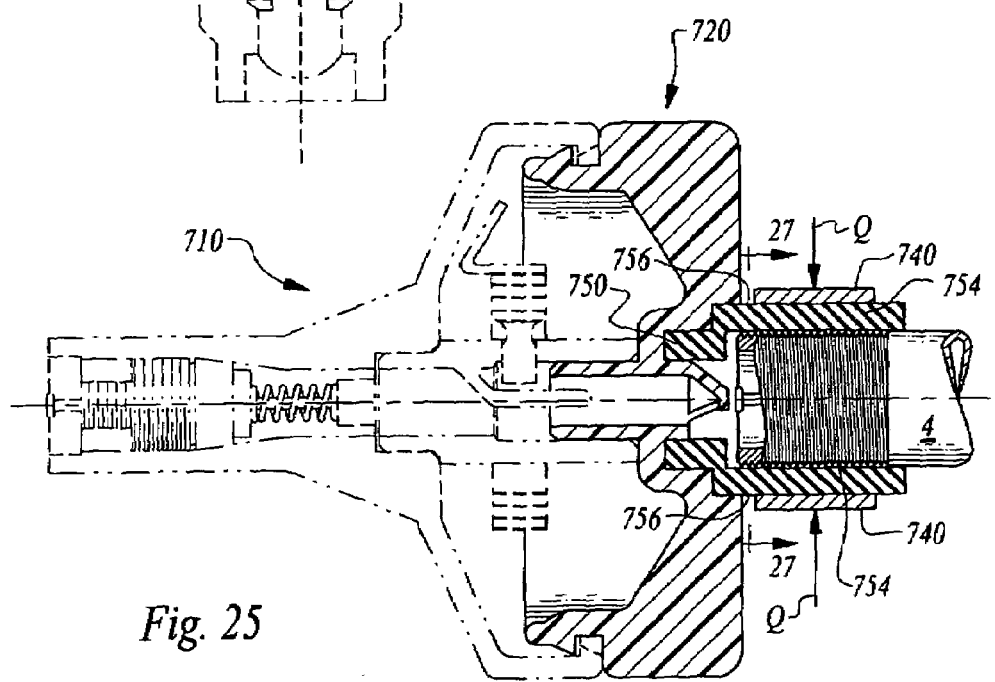
FIG. 25 is a full sectional view of an alternative temporary attachment gauge which utilizes a clamp structure to grip a compression washer surrounding the valve stem, and with portions of the gauge shown in phantom illustrating portions of the upper body of the gauge which are common with prior embodiments of this invention.

With particular reference to FIG. 24, details of a right angle temporary attachment gauge 810 are described. The gauge 810 discloses a distinct form of latching element which can be substituted for the levers 630 of the preferred gauge 610 (FIGS. 20-23). With the gauge 810, the levers 630 are removed. A cylindrical guide sleeve 680 is provided which has a centerline aligned with a central axis of the receiver 640 and valve stem 4. The guide sleeve has an inner diameter only slightly greater than an outside diameter of the valve stem 4. Thus, the guide sleeve 680 keeps the valve stem 4 precisely axially aligned with the receiver 640. The compression washer 650 is modified so that the lower ring has threads thereon facing radially inwardly. These threads 682 have a pitch and major and minor diameters matching that of the valve stem 4 threads.

To utilize the gauge 810, the gauge 810 is translated axially with the guide sleeve 680 moving over the valve stem 4. Once the valve stem 4 has passed entirely into the guide sleeve 680 and the tip of the valve stem 4 is adjacent the compression washer 650, further translation of the gauge 810 occurs by rotating the gauge 810. Such rotation with the valve stem 4 inside the guide sleeve 680 causes the threads on the valve stem 4 to mesh with the threads 682 on the guide sleeve 680, tightly pulling the gauge 810 onto the valve stem 4 and compressing the compression washer 650 to provide a tight seal. The threads 682 preferably only exist for three or four turns directly adjacent the compression washer 650. The remainder of the guide sleeve 680 preferably has a smooth surface. The guide sleeve 680 preferably extends entirely down through the floor 625 of the gauge 810 and even slightly past the floor 625. The length of the guide sleeve 680 keeps the valve stem 4 properly aligned so that even the fine threads of the valve stem 4 resist cross-threading with the threads 682 of the guide sleeve 680. Reversing the direction of rotation allows the gauge 810 to be removed.

This gauge 810 is similar to the gauge 610 except that a valve core of the upper body (shown in phantom in FIG. 24) does not pass through a center of a lens of the gauge, but rather extends along a centerline perpendicular to a centerline of the valve stem 4 and a centerline of the lens of the gauge. This embodiment is provided merely to illustrate that the scope of this invention includes gauges with valve cores for introduction of fill air which can be at a variety of different orientations relative to the valve stem 4 and relative to pressure sensor visual display elements of the gauge. For instance, the valve core could be spaced 45° away from the valve stem 4 or 45° away from the gauge face, or at other angular displacements away from these other structures. Also, the orientation of the valve core and the receiver 640 for the valve stem 4 could be swapped. It is also conceivable that the gauge face, valve stem 4 and valve core could each be mutually perpendicular to each other or exhibiting a skewed relationship to each other where they are neither perpendicular nor parallel nor colinear.

With particular reference to FIGS. 25-28, details of an alternative temporary attachment gauge 710 are described. With this alternative gauge 710, an alternative modified lower body 720 is provided which is interchangeable with upper bodies of other embodiments of this invention described in detail above. With the alternative lower body 720, a clamp 730 is provided as an alternative form of latching element to temporarily but securely attach the alternative temporary attachment gauge 710 to the valve stem 4.

This clamp 730 is provided to act upon an alternative compression washer 750. The alternative compression washer 750 is similar to the compression washer 650 of the previous embodiment except that it includes a long lower ring 754 which is significantly longer extending away from the upper ring 652 (FIGS. 20-24). This long lower ring 754 includes an outer surface 756 against which the clamp 30 acts to secure the gauge 710 to the valve stem 4.

The clamp 730 includes particular structural details as best shown in FIGS. 27 and 28. In particular, the clamp 730 includes a band 740 which has an arcuate form and a circumferential length slightly less than a circumference of the long lower ring 754 of the alternate compression washer 750. A clasp 760 is pivotably attached to the band 740. A handle 770 is also pivotably attached to the band 740. Rotation of the handle 770 when the clasp 760 has engaged the band 740 causes the clamp 730 to exert a radial inward force (along arrow G of FIG. 25) upon the long lower ring 754 of the alternate compression washer 750 to provide a tight seal and strong but temporary support of the alternate temporary attachment gauge 710 upon the valve stem 4.

The band 740 includes an attached end 742 opposite a free end 744. A knob 746 is provided at the free end 744 which is particularly configured to allow engagement with the clasp 760. The clasp 760 includes a pivot post 765 through which the clasp 760 is pivotably attached to the handle 770. The clasp 760 also includes an arm 762 extending away from the pivot post 765. A plurality of hooks 764 are preferably formed upon the arm 762. Each of the hooks 764 can engage the knob 746 of the band 740 individually. The different hooks 764 are spaced apart from each other so that the clamp 730 can be somewhat adjustable in the amount of radial inward compression force that can be applied by the clamp 730. As an alternative, a single hook 764 of appropriate position can be provided. The hook 764 can also be permanently coupled to the knob 746 if desired.

The handle 770 also includes a pivot pin 775 allowing the handle 770 to be pivotably attached to the band 740. In particular, the handle 770 includes a grip 772 extending away from the pivot pin 775 area. A base 774 is rigidly mounted to the band 740 and also pivotably attached to the pivot pin 775. An ear 776 extends slightly from the handle 770 and near the pivot pin 775. This ear 776 supports the pivot post 765 of the clasp 760 thereon.

For utilization of the clamp 730 (FIG. 27) the handle 770 is initially rotated away from the long lower ring 754 to free up the band 740 off of the long lower ring 754. The clasp 760 is then rotated (about arrow M of FIG. 27) until one of the hooks 764 is coupled to the knob 746 on the free end 744 of the band 740. The hook 764 which is selected determines the degree of radial inward force exerted by the band 740 upon the long lower ring 754. The handle 770 is then rotated toward the long lower ring 754 (about arrow M of FIGS. 27 and 28). As the handle 770 is rotated, the band 740 is also caused to rotate slightly at the free end 744 so that the free end 744 is drawn toward the attached end 742 (along arrow P of FIG. 28).

When the handle 770 has been fully rotated (about arrow N) it is typically adjacent the band 740. The band 740 in this configuration exerts a radial inward force (arrow Q of FIG. 25) upon the long lower ring 754 so that the long lower ring 754 is compressed against the valve stem 4 (FIG. 26) sealing the alternative temporary attachment gauge 710 to the valve stem 4.

Typically, when the alternative temporary attachment gauge 710 is being mounted to the valve stem 4, the gauge 710 is first translated until the rim 609 of the valve stem 4 is abutting the receiver 640. The clamp 730 is preferably simultaneously actuated so that the gauge 710 is secured at the same time that it gets translated fully into position with the valve stem 4 adjacent the receiver. The compression washer 750 can exhibit a friction fit with the valve stem 4 to keep the gauge 710 in place until the clamp 730 is activated.

As an alternative, the clamp 730 can be configured so that as the clamp 730 is actuated to tighten the clamp 730, it also causes the clamp 730 to draw the gauge 710 down onto the valve stem 4 slightly to complete the engagement process of the valve stem 4 to the gauge 710. For instance, the band 740 can be configured so that one edge of the band is tightened first and when the second edge of the band is tightened it is drawn closer to the first edge of the band so that a width of the band is narrowed as the band is tightened and the gauge is mounted to the second portion of the band so that the gauge is drawn down towards the first portion of the band after the first portion of the band has already been secured to the valve stem, causing the entire gauge 710 to be drawn onto the valve stem 4.

Figure 29:
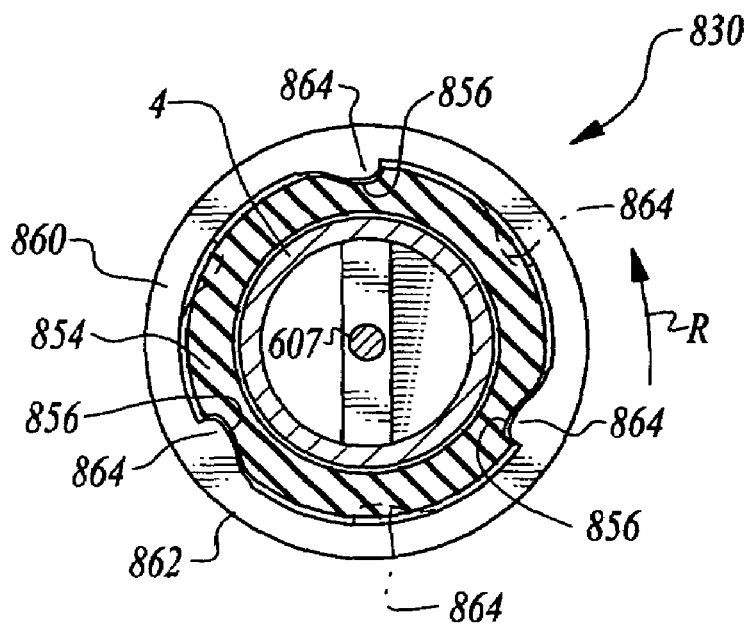
FIG. 29 is a sectional view of an alternative clamp for securing the gauge of this invention to the valve stem.
Figure 30:
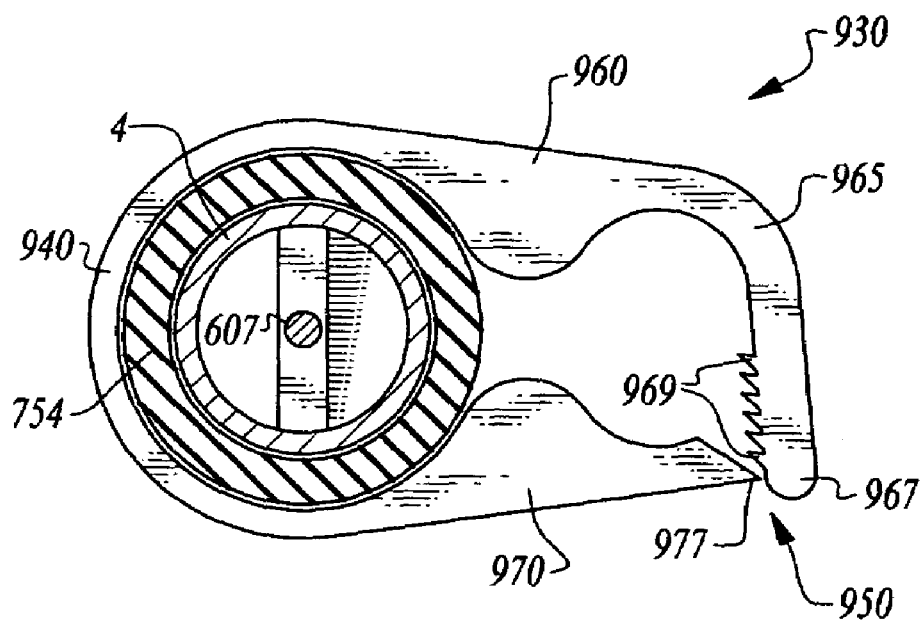
FIG. 30 is a sectional view of another alternative clamp for securing the gauge of this invention to the valve stem.

With particular reference to FIGS. 29 and 30, two further variations on the clamp 730 for the alternative temporary attachment gauge 710 are shown. These alternative clamps include a rotary clamp 830 (FIG. 29) and a grip clamp 930 (FIG. 30). Each of these clamps 830, 930 provide the same general function of exerting a radial compression force along arrow Q of FIG. 25 to secure the gauge 710 temporarily to the valve stem 4.

The rotary clamp 830 would be utilized with a slightly modified long lower ring 854 forming a portion of the alternative compression washer 750 (FIGS. 25-28). The modified long lower ring 854 is similar to the long lower ring 754 of the clamp 730 except that the modified long lower ring 854 includes notches 856 therein. These notches 856 generally have a form matching that of lobes 865 which reside within the notches 856 when the rotary clamp 830 is in a loosened orientation.

The long lower ring 854 is surrounded by a hoop 860 which is of a cylindrical ring-like form completely surrounding the long lower ring 854. The hoop 860 includes a gripping surface 862 facing outwardly. This gripping surface 862 preferably includes some form of grip enhancement such as forming the gripping surface 862 to be roughened with a high friction material or to be scribed with grooves for enhanced friction, or otherwise including ribs or other raised protrusions to assist in allowing a user to easily engage the gripping surface 862 with fingers of the user. Lobes 864 extend radially inwardly from the hoop 860. These lobes 864 preferably have a form which on one side gradually extends inwardly from the inwardly facing surface of the hoop 860, and preferably more abruptly drops back to the original diameter of the inwardly facing surface on the other side.

When the rotary clamp 830 is to be tightened, the user grips the gripping surface 862 with fingers and rotates the hoop 860 in a counter-clockwise direction (along arrow R of FIG. 29) causing the lobes 864 to rotate out of the notches 856 and against the outer surface of the modified long lower ring 854. The lobes 864 are thus compressing the modified long lower ring 854 and forcing the long lower ring 854 tightly against the valve stem 4. To release the rotary clamp 830, the user can either continue to rotate the hoop 860 along arrow R until the lobes 864 drop into the notches 856 again, or rotate the hoop 860 in an opposite direction to cause the lobes 864 to go back into the notches 856 that they were previously within. Once the lobes 864 are within the notches 856, no radial inward force is exerted on the long lower ring 854 so the rotary clamp 830 is in a loosened form and the entire gauge 710 (FIGS. 25 and 26) can be readily removed off of the valve stem 4.

The grip clamp 930 (FIG. 30) includes a belt 940 which wraps around most of a circumference of the long lower ring 754. This belt 740 has ends which support two halves of a clip 950 which can be attached and detached at positions representing different levels of tightness for the belt 740. When the clip 950 is tightly closed, the belt 940 exerts a radial inward force on the long lower ring 754 (along arrow Q of FIG. 25). When the clip 950 is in a less tight coupled position, a lesser amount of radial force is provided. When the clip 950 is released, the grip clamp 930 is in a loosened position for ready attachment and detachment of the gauge 710 onto the valve stem 4.

The clip 950 particularly includes a first finger 960 and a second finger 970 extending substantially parallel to each other and away from the belt 940. The first finger 960 includes a bend 965 of approximately 90°, causing the first finger 960 to extend to a tip 967 adjacent the second finger 970. A plurality of teeth 967 are formed on an inside surface of the tip 967. These teeth 967 are preferably biased so that they are angled slightly toward the bend 967. The second finger 970 extends generally linearly, terminating at a point 977. The point 977 can engage the tip 967 at various different ones of the teeth 969.

When the point 977 has only engaged a tooth 969 closest to the tip 967, the clip 950 is only lightly closed and the grip clamp 930 exerts a relatively low radial force. When the point 977 has engagement with the tooth 969 closest to the bend 967, the clip 950 is in a tightest configuration with the grip clamp 930 most tightly locking the gauge 710 onto the valve stem 4.

To release the clip 950, the first finger 960 is manipulated so that the tip 967 moves away from the long lower ring 754 allowing the point 977 of the second finger 970 to be released from the teeth 967 adjacent the tip 967 of the first finger 960. The entire grip clamp 930 is preferably formed of a substantially rigid but slightly flexible material, such as an injection moldable polyethylene or other hydrocarbon plastic material.

As another alternative, the latching element for the temporary attachment gauge similar to that described in either the embodiment of FIGS. 20-24 or the embodiment of FIGS. 25-28 can be configured with a latching element similar to that of a standard bicycle pump Schraeder valve coupling element with a single lever opposite the receiver of the Schraeder valve coupling element. In such an embodiment, the lever is first pivoted into axial alignment with the coupling element. The coupling element is then placed over the valve stem. Finally, the lever is rotated down causing the coupling element to be securely but temporarily mounted upon the valve stem. In such an embodiment a pressure sensor element would be provided which interfaces with fluid from the tire and within the gauge so that a pressure reading can be provided directly adjacent the coupling element.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure.

For instance, while the gauges of the various embodiments are shown with both the valve core 50 and the receiver 40 aligned with the same central axis Z, the gauges could be alternatively configured so that the valve core 50 and receiver 40 are skewed relative to each other and aligned with separate axes that are not aligned with each other. The relative axial alignments could be perpendicular to each other or have other angular displacements. Examples of such configurations and other variations adaptable to this invention are described in U.S. patent application Ser. No. 11/335, 016, incorporated herein by reference in its entirety.

The sensor chamber can be illuminated to enhance visibility in low light conditions. This illumination could be in the form of photoluminescent materials applied to the indicia (or elsewhere), such as those which are charged by having light incident thereon and then emit light so that they "glow-in-the-dark" for visibility (such as in the evening), or can be coatings which are formed from a substance which is phosphorescent, chemiluminescent, or otherwise exhibits luminosity.

Alternatively, powered lights could be provided to view the sensor tip and indicia of the gauge. In such powered light configurations, some form of power supply (i.e. a battery) would be provided along with a simple electric circuit coupled to a light source. This light source could be an LED, a small incandescent light bulb, or some other form of powered light source. Typically with this powered light source embodiment, some form of switch would be provided to turn on the light when viewing is desired. This switch could be manually toggleable and mounted on the housing or could be a wireless switch (i.e. such as could be on a key chain as a key fob with a button thereon and a wireless transmitter transmitting to a receiver on the gauge 610). A user would depress the button when it is desired that the gauge 610 be read in low light conditions.

When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A tire pressure gauge featuring temporary attachability, the gauge comprising in combination:
   a housing;
   a receiver within said housing, said receiver adapted to interface with a tire valve stem for fluid flow therebetween;
   a pressure sensor coupled to said receiver, said pressure sensor adapted to measure a pressure of the fluid passing into said receiver from the valve stem;
   a valve core coupled to said receiver, said valve core adapted to interface with a source of compressed fluid to allow fluid flow into the valve stem through said receiver;
   at least one lever pivotably attached to said housing, said lever having an inner end adapted to abut the valve stem and an outer end adapted to be manually engaged by a user; and
   said lever adapted to hold said receiver adjacent said valve stem when said lever is rotated about a pivot point between said inner end and said outer end.

2. The gauge of claim 1 wherein at least two levers are provided which are similar to each other and pivotably attached to said housing at separate locations on said housing, each of said levers adapted to engage the valve stem at different portions of the valve stem.

3. The gauge of claim 1 wherein said inner end of said at least one lever includes teeth thereon, said teeth adapted to engage threads on a head of the valve stem.

4. The gauge of claim 1 wherein said lever is adapted to hold said receiver adjacent said valve stem when said lever is rotated in a first direction and said lever is adapted to release said receiver from said valve stem when said lever is rotated in a second direction opposite said first direction.

5. The gauge of claim 1 wherein said at least one lever includes an axle between said inner end and said outer end, said axle rotatably supported by a grommet attached to said housing, said grommet formed of a resilient material such that said axle can translate linearly somewhat during rotation of said lever through compression of portions of said grommet.

6. The gauge of claim 5 wherein at least two levers are provided which are similar to each other and pivotably attached to said housing at separate locations on said housing, each of said levers adapted to engage the valve stem at different portions of the valve stem; and
   wherein said inner ends of said levers include teeth thereon, said teeth adapted to engage threads on a head of the valve stem.

7. The gauge of claim 1 wherein a resilient seal is coupled to said receiver on a side of said receiver adapted to abut a rim of the valve stem, such that said seal prevents fluid escape when said receiver interfaces with the valve stem.

8. The gauge of claim 7 wherein said seal includes a compression washer, said compression washer having an upper ring adjacent said receiver and a lower ring coupled to said upper ring and extending from said upper ring and away from said receiver and toward the valve stem when the valve stem is oriented for interfacing with said receiver, said lower ring having a side wall with a diameter greater than a diameter of said upper ring, said upper ring having a face with a width similar to a difference between a radius of said upper ring and a radius of said lower ring, said face adapted to abut the rim of the valve stem with said side wall adapted to abut a cylindrical threaded surface of the valve stem adjacent the rim.

9. The gauge of claim 1 wherein said pressure sensor is coupled to a visible display, said visible display adapted to provide a reading of pressure visible to a user.

10. The gauge of claim 9 wherein said pressure sensor and said visible display include a Bourdon tube with a portion of said Bourdon tube in fluid communication with said receiver, and with a portion of said Bourdon tube visible through an at least partially transparent wall of said housing, said gauge including a means to protect said Bourdon tube from receiving fluid at a pressure greater than a maximum design pressure for said Bourdon tube even when a pressure of fluid from a source of compressed fluid coupled to said valve core is greater than said maximum design pressure for said Bourdon tube.

11. A method for easy and temporary attachment of a fill-through gauge to a valve stem of a tire, the method including the steps of:
 providing a tire pressure gauge having a housing, a receiver within the housing, the receiver adapted to interface with a tire valve stem for fluid flow therebetween, a pressure sensor coupled to the receiver, the pressure sensor adapted to measure a pressure of the fluid passing into the receiver from the valve stem, a valve core coupled to the receiver, the valve core adapted to interface with a source of compressed fluid to allow fluid flow into the valve stem through the receiver, and at least one manually actuated latching element adapted to secure the gauge to the valve stem when actuated;
 placing the gauge proximate to the valve stem with the receiver adjacent a rim of the valve stem; and
 actuating the latching element.

12. The method of claim 11 wherein said providing step includes the gauge having a clamp with a band adapted to circumscribe the valve stem, the clamp including a pivotable handle adapted to tighten the band when the pivotable handle is pivoted.

13. The method of claim 12 wherein the clamp includes a clasp pivotably attached to the handle, the clasp including a plurality of hooks spaced from each other and the band including a knob at an end of the band opposite where the handle is pivotably attached to the band, each of the hooks of the clasp adapted to releasably engage the knob of the band.

14. The method of claim 13 including the further step of selecting one of the plurality of hooks for tightening of the clamp, placing the selected hook upon the knob of the band and actuating the latching element by rotating the handle.

15. The method of claim 11 wherein said providing step includes the gauge having at least one lever pivotably attached to the housing, the lever having an inner end adapted to abut the valve stem and an outer end adapted to be manually engaged by a user, and the lever adapted to hold the receiver adjacent the valve stem when the lever is rotated about a pivot point between the inner end and the outer end.

16. The method of claim 15 wherein said actuating step includes the step of simultaneously pushing the housing toward the valve stem while pulling on the at least one lever.

17. The method of claim 16 wherein said providing step includes the gauge having at least two levers wherein at least two levers are provided which are similar to each other and pivotably attached to said housing at separate locations on said housing, each of said levers adapted to engage the valve stem at different portions of the valve stem; and
 said actuating step includes the steps of pulling on both of said levers while pushing on the housing.

18. The method of claim 17 including the further step of removing the gauge from the valve stem by pushing on the levers.

19. A temporary locking tire pressure gauge, comprising in combination:
 a housing;
 a receiver within said housing, said receiver adapted to interface with a tire valve stem for fluid flow therebetween;
 a pressure sensor coupled to said receiver, said pressure sensor adapted to measure a pressure of the fluid passing into said receiver from the valve stem;
 a valve core coupled to said receiver, said valve core adapted to interface with a source of compressed fluid to allow fluid flow into the valve stem through said receiver; and
 at least one manually actuated latching element adapted to secure the gauge to the valve stem when actuated.

20. The gauge of claim 19 wherein a resilient seal is coupled to said receiver on a side of said receiver adapted to abut a rim of the valve stem, such that said seal prevents fluid escape when said receiver interfaces with the valve stem.

21. The gauge of claim 20 wherein said seal includes a compression washer, said compression washer having an upper ring adjacent said receiver and a lower ring coupled to said upper ring and extending from said upper ring and away from said receiver and toward the valve stem when the valve stem is oriented for interfacing with said receiver, said lower ring having a side wall with a diameter greater than a diameter of said upper ring, said upper ring having a face with a width similar to a difference between a radius of said upper ring and a radius of said lower ring, said face adapted to abut the rim of the valve stem with said side wall adapted to abut a cylindrical threaded surface of the valve stem adjacent the rim.

22. The gauge of claim 19 wherein said at least one manually actuated latching element includes a clamp with a band adapted to circumscribe the valve stem, the clamp including a pivotable handle adapted to tighten the band when the pivotable handle is pivoted.

23. The gauge of claim 22 wherein said clamp includes a clasp pivotably attached to said handle, said clasp including a plurality of hooks spaced from each other and said band including a knob at an end of said band opposite where said handle is pivotably attached to said band, each of said hooks of said clasp adapted to releasably engage said knob of said band.

24. The gauge of claim 19 wherein said at least one manually actuated latching element includes at least one lever pivotably attached to said housing, said lever having an inner end adapted to abut the valve stem and an outer end adapted to be manually engaged by a user, and said lever adapted to hold said receiver adjacent said valve stem when said lever is rotated about a pivot point between said inner end and said outer end.

25. The gauge of claim 24 wherein at least two levers are provided which are similar to each other and pivotably attached to said housing at separate locations on said housing, each of said levers adapted to engage the valve stem at different portions of the valve stem.

26. The gauge of claim 25 wherein said inner end of said at least one lever includes teeth thereon, said teeth adapted to engage threads on a head of the valve stem.

27. The gauge of claim 26 wherein said at least one lever includes an axle between said inner end and said outer end, said axle rotatably supported by a grommet attached to said housing, said grommet formed of a resilient material such that said axle can translate linearly somewhat during rotation of said lever through compression of portions of said grommet.

* * * * *